United States Patent [19]

Kramer et al.

[11] Patent Number: 5,215,554
[45] Date of Patent: Jun. 1, 1993

[54] MEMBRANES HAVING ENHANCED SELECTIVITY AND METHOD OF PRODUCING SUCH MEMBRANES

[75] Inventors: Paul W. Kramer, Ellisville; Milton K. Murphy, Clayton; Donald J. Stookey, Creve Coeur; Jay M. S. Henis, St. Louis; Erwin R. Stedronsky, Richmond Heights, all of Mo.

[73] Assignee: Permea, Inc., St. Louis, Mo.

[21] Appl. No.: 880,930

[22] Filed: May 11, 1992

Related U.S. Application Data

[63] Continuation-in-part of Ser. No. 713,915, Jun. 12, 1991, abandoned.

[51] Int. Cl.$^5$ .............................................. B01D 53/22
[52] U.S. Cl. .......................................... 55/16; 55/68; 55/158; 55/524
[58] Field of Search ...................... 55/16, 68, 158, 524

[56] References Cited

U.S. PATENT DOCUMENTS

| | | | |
|---|---|---|---|
| 4,230,463 | 10/1980 | Henis et al. | 55/16 |
| 4,311,573 | 1/1982 | Mayhan et al. | 204/159.15 |
| 4,472,175 | 9/1984 | Malon et al. | 55/158 X |
| 4,486,202 | 12/1984 | Malon et al. | 55/158 |
| 4,575,385 | 3/1986 | Brooks et al. | 55/158 |
| 4,589,964 | 5/1986 | Mayhan et al. | 522/85 |
| 4,654,055 | 3/1987 | Malon et al. | 55/158 |
| 4,717,393 | 1/1988 | Hayes | 55/158 X |
| 4,717,394 | 1/1988 | Hayes | 55/158 X |
| 4,728,346 | 3/1988 | Murphy | 55/158 |
| 4,828,585 | 5/1989 | Chiao | 55/158 X |
| 4,838,904 | 6/1989 | Sanders, Jr. et al. | 55/158 |
| 4,965,026 | 10/1990 | Janssen | 264/22 |
| 4,968,532 | 11/1990 | Janssen et al. | 427/164 |
| 5,042,993 | 8/1991 | Meier et al. | 55/16 |
| 5,045,093 | 9/1991 | Meier et al. | 55/158 X |
| 5,045,357 | 9/1991 | Motonaga et al. | 55/158 X |
| 5,082,558 | 1/1992 | Burris | 55/158 X |

FOREIGN PATENT DOCUMENTS 2089285 6/1982 United Kingdom.

OTHER PUBLICATIONS

Billmeyer, "Textbook of Polymer Science", 3rd ed. John Wiley & Sons, N.Y. 1984.
P. S. Bailey, Ozonation in Organic Chemistry vol. II Nonolefinic Compounds, Academic Press, N.Y. 1982.
Lanlais, B. et al., Ozone in Water Treatment: Application and Engineering Lewis Publishers, Chelsea, Mich. 1991 (Chap 2 pp. 11-132).

Primary Examiner—Robert Spitzer
Attorney, Agent, or Firm—Martha A. Michaels

[57] ABSTRACT

Glassy polymeric gas separation membranes are chemically modified throughout the thickness thereof. Such membranes manifest selectivity for a pair of gases which is greater than the intrinsic selectivity of the glassy polymeric material and which is greater than the equilibrium intrinsic selectivity of the chemically modified glassy polymeric material.

98 Claims, No Drawings

MEMBRANES HAVING ENHANCED SELECTIVITY AND METHOD OF PRODUCING SUCH MEMBRANES

This application is a continuation-in-part of U.S. Ser. No. 713,915 filed on Jun. 12, 1991, now abandoned.

BACKGROUND OF THE INVENTION

1. Field

The present invention relates to gas permeable membranes and, more particularly, relates to gas permeable polymeric membranes or composite membranes comprising at least one glassy polymer, which membranes are preformed and subjected to conditions wherein a chemical reaction such as an oxidative reaction takes place throughout the membrane. The resulting membrane manifests enhanced selectivity for at least one pair of gases, vapors, or molecules (permeating by solution diffusion through the glassy polymeric membrane) as compared to the intrinsic selectivity of the polymer, or polymers, making up the membrane, and as compared to the equilibrium intrinsic selectivity of the chemically modified polymer or polymers, for the same selected pair of gases, vapors or molecules. In a preferred embodiment, an asymmetric hollow fiber membrane comprising a glassy polymer, such as polysulfone, is ozone-treated in order to enhance the selectivity thereof for a pair of gases, as compared to the intrinsic selectivity of the polysulfone, and as compared to the equilibrium intrinsic selectivity of the ozone-treated polysulfone for the same pair of gases. 2. Related Art Several methods have been developed for enhancing the selectivity of fluid permeable membranes by changing the surface characteristics thereof. For example, Janssen et al., U.S. Pat. No. 4,968,532, disclose ozone treatment of a preformed polymer substrate which is saturated or swollen with a liquid in order to graft polymerize a monomer to the surface of said substrate and thus modify only the surface characteristics thereof. Alternatively, the substrate is treated with ozone and then saturated or swollen with a liquid prior to exposure to a graft monomer. See also U.S. Pat. Nos. 4,311,573 and 4,589,964.

Shimomura et al., U.K. 2 089 285, disclose gas separation membranes obtained by exposing a porous hollow fiber to a plasma consisting of a gaseous organic compound, an inorganic gas or a mixture thereof in order to form a dense cross-linked layer on the surface of such membrane.

Brooks et al., U.S. Pat. No. 4,575,385, disclose membranes having improved permeation selectivities wherein an asymmetric gas separation membrane is contacted on one or both surfaces with an effective amount of an aromatic permeation modifier. Murphy, U.S. Pat. No. 4,728,346, discloses coated membranes having improved permeation selectivities wherein an asymmetric gas separation membrane is contacted on one or both surfaces with an aromatic permeation modifier and combined with a coating. See also U.S. Pat. No. 4,654,055, to Malon et al, wherein a membrane is contacted on one or both sides with a Bronsted-Lowry base which does not produce chemical changes in the polymer, and U.S. Pat. No. 4,486,202 wherein a membrane is treated with a Lewis acid.

Selectivity enhancement of membranes through modifications to the surface thereof are limited in that only a limited percentage of the surface can be modified without affecting the overall physical characteristics of the membrane and further in that the modification is specifically limited to conditions under which the chemical bonds are stable. It has now been discovered that selectivity enhancement can be achieved, and to a much greater extent, by modifying the interstices or recesses of the membrane substantially throughout the thickness thereof.

While other methods (especially those of surface modification) have been shown to improve the selectivity of specific membranes, such methods are generally accompanied by significant decreases in the permeability of the faster specie. The current method provides significant selectivity increases for many polymers with very minimal loss in permeability for the modified polymer.

SUMMARY OF THE INVENTION

The present invention is directed to gas permeable polymeric membranes having been preformed and chemically modified substantially throughout the thickness of the separating layer thereof, i.e., beyond or below the surface to an appreciable depth as well as being modified at the surface thereof, and having enhanced selectivity as compared to the intrinsic selectivity of the polymer material of which the preformed membrane was made and as compared to the selectivity characteristic of the modified polymer in its equilibrium state. In the case of a multicomponent or composite membrane, the membrane has enhanced selectivity as compared to the polymer and chemically modified polymer materials making up the separating region of the membrane. For example, where a membrane includes a polymeric coating on a porous polymeric substrate (where the porous substrate polymer controls the selectivity of the membrane, e.g., as in resistance model composites), or where a membrane includes a dense coating on a porous support (where the coating material controls the separation selectivity), such membranes have enhanced selectivity as compared to the polymer and chemically modified polymer materials making up the portion of the composite membrane which controls the separation. Resistance model composites may be considered as a special case of an asymmetric membrane and the subject invention applies to both asymmetric and dense forms of membranes produced from a glassy polymer, or containing as one component a glassy polymer, so long as the separation or use of the membrane is determined by the separation and selectivity of molecules permeating by solution diffusion through the glassy polymer.

Accordingly, the present invention is directed to a gas permeable membrane, such as a porous hollow fiber, particularly an asymmetric hollow fiber, or a dense polymer membrane such as a film or fiber, which is subjected to a suitable chemical reaction, e.g., an oxidative reaction such as ozonation, under suitable conditions. Selectivity of the membrane is thereby increased as evidenced by a relatively small decrease in permeability (P) shown for the faster molecule of the two soluble species, while the permeability of the slower of the two soluble species is decreased to a greater degree than the faster.

It is a particularly surprising element of the invention that the selectivity for common pairs of desirable gases can be increased to values far in excess of those observed for the unmodified polymers and far in excess of the selectivities reported for membranes or films cast from polymers containing the functional species which have been added to the polymer by the chemical reaction disclosed herein. A further surprising element of the invention is that the same reactant causes these effects in a wide range of chemically very different polymers.

DETAILED DESCRIPTION OF THE INVENTION

For clarity and brevity in the delineation of the present invention, the following description will be directed primarily toward modified polymeric asymmetric membranes wherein an asymmetric or composite membrane comprising a glassy polymer is oxidatively-treated using ozone to enhance the selectivity thereof for a pair of gases as compared to the intrinsic selectivity of the glassy polymer and the chemically modified glassy polymer for the same pair of gases. It should be noted, however, that the present invention includes other gas-permeable polymeric membranes comprising a glassy polymer, which membranes (in the solid state) have been subjected to a chemical reaction, such as an oxidative reaction by oxidants other than ozone, which oxidants contact and dissolve within the network of polymer chains which comprise the solid state membrane. The treated or modified membranes manifest enhanced selectivity as compared to the intrinsic selectivity of the polymer material.

As utilized herein, the term "nonequilibrium" refers to the deviation between the measured selectivity of the treated membrane from the lowest energy ("normal") and/or isotropic selectivity which would be determined for the unreacted starting polymer and/or for the chemically or oxidatively modified polymer cast into a dense membrane from solution or melt extruded as a dense membrane or fiber. Membranes which are subjected, according to the teachings of the present invention, to an oxidative reaction, e.g., ozonation, in order to increase the selectivity thereof retain such property so long as the membrane remains in the initial nonequilibrium state induced by and during the reaction. That is, if the membrane is subjected to conditions wherein the initial nonequilibrium state thereof is modified, the property is not retained. For example, if the membrane is dissolved in a suitable solvent and then recast or reformed into a membrane, or is heated to a temperature above the glass transition temperature (Tg), or, in some instances, which approaches or is within 50° C. of the (Tg) of the polymer material and recast or reformed, i.e., the modified polymer is now in its equilibrium state and has an intrinsic selectivity associated with such state, such property is not retained. Thus, the enhanced selectivity is considered to be "nonequilibrium" in a sense, but in fact may be quite stable from a practical standpoint. Therefore, the membranes of the present invention have a selectivity greater than the intrinsic selectivity of the glassy polymeric material of which the membrane is made and greater than the equilibrium intrinsic selectivity of the chemically modified polymer.

The phrase "ozone-uptake" refers to the amount of ozone that is reacted with a polymeric membrane. Several methods of measuring such amounts are well known in the art and include measurement of weight changes, measurement of spectroscopic (e.g., UV, IR, NMR, ESCA, and the like) signatures for production of oxidized species, total elemental analysis, and the like. A preferred method is to measure the increase in weight of the membrane after the membrane has been treated with ozone.

The term "glassy polymeric material" refers to polymeric materials which tend to flow to a certain degree upon heating to a temperature above the glass transition temperature (Tg). Such polymers may or may not contain varying degrees of crystallinity and can include homopolymers, copolymers, and block copolymers and blends of appropriately chosen mixtures of such polymers. See generally, Billmeyer, *Textbook of Polymer Science.* 3rd ed., John Wiley and Sons, New York, 1984, which is incorporated herein by reference.

The term "oxidative reaction" refers to those chemical reactions wherein oxidation of a substrate occurs so that modification of certain characteristics of the membrane is observed without significant degradation thereof. "Significant degradation" means degradation of the membrane to the extent that permeability of the membrane is increased, e.g., through etching, the creation of pores or channels in the membrane, a gross decrease in molecular weight of the polymer material or loss of necessary physical or mechanical properties such as, for example, elongation to break. Such degradation typically can occur with plasma, and other overly aggressive chemical treatments, including oxidative treatments, where chemical reaction occurs primarily on the surface thereof and in the presence of highly energetic atoms, ions, radicals and/or electrons. However, an increase in permeability is not necessarily indicative of degradation and may result from an increase in the solubility of a given specie due to the chemical changes induced in the glassy polymeric membrane by reaction. Therefore, where permeability increases are observed, it is necessary to demonstrate that the increase is not related to increased specie solubility and is in fact a result of defects and etching by the active species present in the plasma discharge. This is routinely accomplished by evaluating such changes as a function of the molecular type, weight and size of a number of permeant species.

The phrase "throughout the thickness thereof" refers to modification of the surface as well as beyond or below the surface of the membrane, which includes at least partially, modification of the interstices and recesses available between the surfaces, i.e., modification substantially throughout the thickness of a preformed membrane such as a film and of the thickness of the walls of a preformed hollow fiber.

Suitable membranes are those which are gas permeable and comprise a glassy polymeric material susceptible to oxidative or other chemical reactions which result in the formation of a covalent bond between the reactant and the solid polymeric membrane material. Such glassy polymeric materials typically, but not necessarily, include aromatic moieties. Examples of such materials include polysulfones, polyphenylene oxides, polyetherketones, polycarbonates, polyimides, polyetherimides, polyamides, polyamideimides, styrenic polymers, polyesters, polyester-carbonates, polyarylimides, and the like, including blends and copolymers thereof. Examples of glassy polymeric materials and copolymers which do not contain aromatic moieties and are useful in the present invention include cellulosic polymers such as cellulose acetates and ethyl cellulose, and, for example, such glassy polymers as can be produced containing phosphorous, silicon, or acrylic acrylonitrile, polymers functionalities. The membrane suitable for use in the present invention can be in form of hollow fibers, flat films or sheets, or spiral wound membranes and the like.

Methods for preparing gas permeable membranes comprising such polymeric materials are well known in the art. A preferred method is disclosed in Henis et al, U.S. Pat. No. 4,230,463 which is incorporated herein by reference. Such membranes can be coated with a material which does not significantly alter the permeability characteristics of the membrane with respect to one gas in a mixture of gases but which tends to increase the selectivity of the membrane to a selectivity approaching the intrinsic selectivity of the polymer of the base membranes for the one gas over a slower permeating gas or gases. These types of membranes are typically called resistance model composite membranes. In such membranes, the substrate is porous and typically contains what may be uniform pores or, in some instances, what may be referred to as defects. The coating material fills, plugs or occludes these pores or defects preventing them from reducing the separating properties of the substrate by allowing leakage of gas by Knudsen diffusion or laminar flow through the pores or defects.

In general, for preparation of asymmetric membranes, the desired polymeric material is dissolved in a suitable solvent system to effect a concentration of polymer of from about 1 to about 45 weight percent based on the total weight of solution. The membrane is then spun from the solution (wet/dry spinning process utilizing a nozzle for hollow fibers), the solvent is partially evaporated and the membrane, e.g., a spun fiber, is coagulated and solidified in a nonsolvent to obtain the membrane. The membrane is then wound on bobbins, treated for removal of solvent, cut into desired lengths and dried. The preformed membranes are then subjected to ozonation according to the following general procedure. It should be noted that other oxidative reactions can be utilized so long as the oxidant is able to permeate the membrane and react with the polymeric material below the membrane surface as well as at the membrane surface and so long as the reaction is carried out with the membrane in the solid state, where in such reaction may be nonuniformly or not necessarily uniformly, throughout the thickness. Where the membrane is coated and defect-cured with a second polymer prior to carrying out the reaction, the reactant should possess relatively low reactivity with the coating and possess sufficient permeability to reach the substrate membrane. Preferably, the reactivity and permeability will be such that a significant fraction of the ozone to which the coating is exposed can pass through such coating to reach and react with at least a portion of the substrate material.

The membrane is exposed to an ozone-oxygen mixture but may be exposed to ozone in admixture with other carrier gases as well, such as, for example, $O_2/N_2$ mixtures, $N_2$, argon and the like. The membranes of the subject invention are prepared by subjecting a gas permeable polymeric membrane to an oxidative reaction in the solid state. Thus, an asymmetric membrane comprising a glassy polymeric material is treated with ozone. Alternatively, the oxidant may be brought into contact with the membrane by first dissolving the oxidant in a liquid material which may be inert or which may participate in the reaction process, said liquid material at least being a carrier which serves to bring the oxidant in contact with the membrane. The membrane is then brought into contact with the oxidant containing liquid.

A suitable concentration of ozone, i.e., an effective amount, will depend on the reactivity of the polymer, the time period for which the membrane will be exposed to the ozone and the desired selectivity and permeability properties of the membrane. Preferably, the concentration of ozone in gaseous carriers is within a range of from about 0.01 wt. % to about 10 wt. %, most preferably from about 0.01 wt. % to about 5 wt. %. A most preferred concentration range is about 0.05-1.0 wt. %. In a liquid carrier the concentration will preferably be the range determined by the partition coefficient of the ozone from the gas phase into the carrier consistent with the gas phase concentrations listed above. The membrane is exposed to the ozone for a period of time ranging from about five minutes to about twenty-four hours, again depending on the reactivity of the polymer, the concentration of ozone, the temperature and the desired selectivity. It is within the skill of one familiar with preparation of gas permeable membranes and polymer reactions to determine appropriate oxidant concentration, e.g., ozone concentration, and time periods to achieve a desired degree of reaction to thereby achieve an increase in selectivity. For example, similar rates and selectivities are achieved from a polysulfone membrane or hollow fiber of constant dimensions and initial properties reacted from two hours to eight hours with inlet concentrations ranging from 0.2% to 0.05% ozone.

A gas phase oxidant such as ozone in a carrier gas brought into contact with the solid membrane is a preferred embodiment of the invention. Contacting the solid membrane with an oxidant in the gaseous phase is a preferred method but is not necessarily a limiting way of carrying out the oxidative reaction of the invention. Other methods are also suitable. For example, an oxidant supplied in the gaseous state and dissolved in a liquid carrier or coating on the surface of the solid membrane may be employed. In addition, an oxidant can be generated within a liquid carrier such as peroxy radicals or ions, or hydroxy radicals or ions, may be suitably employed in certain circumstances. For example, for reactions which are highly exothermic involving heat evolution, it may be desirable to dissipate said heat by contact with the liquid carrier.

Following the initial reaction step, a post-reaction thermal treatment (bake), preferably utilizing cross-flow drying, is found desirable (but not necessary to observe increased selectivity) from the standpoint of controlling the post-reaction chemistry, exotherm, and physical properties (e.g., Mw) of the treated membrane. A most desirable range of thermal treatment and time for polysulfone is from 50° C. to 90° C., preferably from about 60° to about 80° C., and from 1 to 24 hours. The bake temperature should be at least as high as the ultimate application use temperature envisioned for the membrane but as far below the Tg of the starting polymer or of the separating layer in an asymmetric membrane as is possible or practiced, and no higher than the Tg of the glassy polymer separating layer of a composite membrane whose separating layer is a dense polymeric film. In the case of a composite whose separating membrane may be a glassy porous support coated with some other polymer, thermal treatment should be as much as 50° C. below the Tg of the porous or asymmetric support of said membrane.

Agents which can induce cross-linking and additional reactions within the polymer matrix, when used, can be applied to the membrane prior to exposure to ozone, after exposure to ozone and prior to the bake step, or after the bake step. These agents may be reactive towards the unmodified polymer matrix, towards metastable ozonide or peroxide sites introduced by the ozonation reaction, or towards stable species formed after decomposition of the metastable ozonides or peroxides. Additionally, such agents can be applied during exposure of the membrane to ozone, by bringing one side of the membrane into contact with said agent while the other side is in contact with ozone and/or by mixing said agent with the ozone. In the latter case, the selection of said agent is restricted such that side reactions of said agent with ozone will not excessively deplete the concentration of ozone or agent prior to the mixture coming into reactive and diffusive contact with the membrane. Suitable agents for use in the present invention include hydrogen sulfide, substituted silanes, unsaturated hydrocarbons, and vinylic or acetylenic monomers. Those skilled in the art of polymer cross-linking or of the reaction chemistry of ozone with organic compounds can identify other suitable reagents.

One way to characterize the membranes of the present invention is by determining the degree of ozone-uptake which can be measured by an increase in weight of the membrane following ozone treatment. According to one currently accepted model of gaseous diffusion and permeation, gas permeable membranes contain free volume between the polymer chains. It is believed that restriction of such free volume void spaces or reduction in the average size of such free volume regions of the membranes, can lead to increased selectivity because such changes would differentially affect permeants of different dimensions. It is believed that when ozone reacts with polymer chains, such restriction or partial blockage occurs.

Another way of describing the effect of ozonation on the membrane is in terms of the restriction in cooperative chain movement required for the diffusion of molecules of different size through the polymer network. Reaction in the solid state creates side groups on the polymer chains which cannot easily rearrange since they are frozen in place by prior established interactions of the polymer chains (prior to modification) with adjacent chains when the original membrane is formed. These added groups are not in their equilibrium conformation and as such constrain the free motion of the whole chain to which they are attached, and also of nearby chains. Without such free motion, it becomes much more difficult for such chains to move cooperatively in order to create voids between them large enough for the larger molecules in a mixture to diffuse through, and so selectivity for small molecules over larger ones is enhanced.

In either description, however, one has created a nonequilibrium state within the glassy polymer network which, unless further modified or cross-linked, would be expected to relax on melting, dissolution of the membrane, or approach to the rubbery state in which chains can move relatively freely with respect to one another. The enhanced selectivity is a property of this "frozen" nonequilibrium state of the solid glassy membrane, rather than of the chemically modified polymer itself, i.e., the chemically modified polymer in its equilibrium or nonfrozen state, or of a membrane in its equilibrium state composed of such a modified polymer. Thus, ozone-uptake is one method for characterizing the membranes of the present invention having enhanced selectivity. The degree of ozone-uptake chosen will depend on the intrinsic selectivity of the polymeric material used to prepare the membrane and the final desired selectivity for the particular membrane. Preferably, the degree of ozone-uptake will range from about 0.01 wt. % to about 40 wt. % based on the weight of the membrane prior to treatment. A most preferred range is from about 0.1 wt. % to about 20 wt. %.

Another way to characterize the membranes of the present invention is by measuring the increase in selectivity of the membrane as compared to the intrinsic selectivity of the polymeric material. For example, polysulfone has an intrinsic selectivity for a pair of gases, which selectivity remains substantially the same, i.e., is not significantly altered, when the polysulfone is utilized to produce the starting membrane. Membranes of the present invention manifest increased selectivity through free volume reduction or restriction and/or chain motion restriction or constraint as described above, and to a certain limited extent with respect to certain gases, manifest increased selectivity through different solubility characteristics of one of the gases of the pair of gases with respect to the other gas. Generally the increase in selectivity, i.e., a "significant increase", will range from about 5% to about 2,000% with respect to the selectivities of the glassy polymeric material and the modified polymeric material and will depend on the density, free volume, and close packing of the reacted polymers, the degree of ordering of the polymer chains initially present in the membrane, the reactivity of the polymer with respect to ozone, the extent of reaction the polymer undergoes, and the pair of permeants chosen to measure selectivity. For example, for $H_2$ and/or $He$ over $N_2$, $CO_2$, $CH_4$, or other common hydrocarbon gases and vapors, a significant increase is greater than about 25%. For $O_2/N_2$, a significant increase is greater than about 10%, as compared to the intrinsic selectivity of the glassy polymeric material of which the membrane is made.

The membranes of the present invention are suitable for, but not limited to, separating various pairs of gases such as for example $He/N_2$, $H_2/N_2$, $H_2/CH_4$, and $N_2/O_2$, $H_2/CO_2$, $He/CO_2$, $He/O_2$, $H_2O/Air$, $H_2O/N_2$, $H_2O/CH_4$, $H_2O/CO_2$, $He/CH_4$ as well as for other selected gas pairs. Thus, another aspect of the present invention involves a method of separating a pair of gases utilizing a membrane of the present invention, and still another aspect of the invention involves a process for selecting and adjusting the selectivity of a preexisting membrane for a given pair of gases by controlling the exposure of the membrane to ozone for a given time at a given concentration.

Oxidative reactants which are considered to be equivalents of ozone include nitrogen oxides, hydrogen peroxide, nitric acid, persulfate ion, permanganate ion, and the like which can be used according to the teachings of the present invention under appropriately chosen conditions of temperature, time and reactant activity for each particular polymer and polymer/reactant reaction rate constant. Such reactions may or may not benefit from the use of catalysts either in the gas phase or added to the membrane prior to reaction. Utilizing the teachings of the present invention, one skilled in the art can modify a selected polymeric membrane with an oxidative gas phase reactant, or other chemical reactant, in order to increase the selectivity of such membrane.

The following examples further illustrate gas separation membranes prepared according to the teachings of the present invention. These examples are to be considered illustrative and are not intended to limit the scope of the present invention.

EXAMPLE 1

This example illustrates ozonation of resistance model composite membranes and demonstrates the increased selectivity of such composites as a result of such ozonation. Gas transport property test results, for various membrane samples in this example, are shown in Table 1.

Hollow fiber membranes in this example were fabricated by wet/dry spinning of a solution of polymer (37 weight percent of total solution) dissolved in a mixture (87/13 weight/weight ratio) of 1-formylpiperidine and formamide, which mixture comprised 63 weight percent of the total polymer solution.

Spinning comprised extrusion of the polymer solution through a pin-in-orifice spinnerette at temperatures between about 50° and 80° C., with water injected into the pin of the spinnerette to form the bore of the hollow fiber. After extrusion of the polymer solution from the spinnerette, the fiber passed through an air gap of about 15 cm (6 inches) and was drawn through a water coagulation bath at a temperature of about 0°-10° C., at a linear rate in the range of 50-100 meters per minute. After coagulation the solid asymmetric hollow fiber membrane was wound onto a bobbin and subsequently washed in water at about 20°-25° C. for at least 24 hours to remove residual spinning solvents. After washing, the fiber was removed from the bobbin and dried in air at about 80°-110° C. for about 4-8 hours.

Polysulfone (Amoco, Udel P-3500, bis-phenol-A polysulfone polymer) asymmetric hollow fiber membrane samples were tested for gas transport properties, using test gases helium and nitrogen at about 6.8 atmospheres (100 psi) gas pressure differential across the fiber wall at test temperature in the range of 23°-25° C. Each sample comprised about 25 cm$^2$ active membrane surface area.

Samples number 1-4 were tested uncoated to demonstrate that the separating layer of the asymmetric hollow fiber membrane contains some minor imperfections, as indicated by a measured helium/nitrogen selectivity significantly lower than the intrinsic selectivity (about 63 at test temperature) of the polysulfone polymer material of the membrane. Measured helium/nitrogen selectivities for these uncoated samples in the range of about 5-6 indicate that the imperfections in the membrane separating layer are minor and small in size, in that the measured selectivities are greater than the selectivities of about 2.6 calculated for Knudsen flow through pores for helium and nitrogen under these test conditions.

Samples number 5-8, produced in the identical membrane fabrication run as samples 1-4, were coated with a poly(dimethyl)silicone rubber from dilute liquid solution in a volatile hydrocarbon (2-methyl-butane) to plug minor imperfections in the membrane separating layer by occluding contact of the deposited silicone with such imperfections. After coating and evaporation of the volatile hydrocarbon liquid, coated samples 5-8 were retested for helium and nitrogen gas transport properties. Gas tests results on these samples indicate the resultant coated, imperfection-free resistance model composite membranes exhibit essentially the intrinsic helium/nitrogen selectivity of the polysulfone polymer material of the membrane.

The test results for samples 5-8 further demonstrate that the silicone coated membranes are resistance model multicomponent membranes, according to the teachings of Henis, et.al., U.S. Pat. No. 4,230,463, in that the measured helium/nitrogen selectivities are essentially equal to that of the polymer material of the membrane, i.e. polysulfone, significantly higher than that of the material of the occluding coating, i.e. poly(dimethyl)silicone rubber, which has an intrinsic selectivity for helium/nitrogen of about 1, and significantly higher than the measured selectivities of the uncoated membranes for the test gas pair.

Samples 5-8 were ozonated by exposure of the samples to ozone in the concentration range of 5-5.6 percent by weight in a carrier of gaseous oxygen, for 1 hour at temperatures in the range of 20°-22° C. Flow rate of ozone containing gas was in the range of 7.2-7.8 liters/minute at pressure in the range of 0-0.068 atmospheres gauge (0-1 psig), with essentially no pressure differential, i.e. less than 0.068 atmospheres (less than 1 psi) across the fiber wall. At the end of the 1 hour treatment period, the samples were flushed for 15 minutes with a purge flow of carrier gas which contained no ozone to remove any residual ozone and terminate the ozonation.

The tests results for the ozonated coated samples 5-8 demonstrate the increased selectivity of resistance model composite membranes as a result of ozonation. For samples 5-8 the ratio of helium/nitrogen selectivities, [ozonated/coated], for tests of coated samples after and before ozonation, show an average ratio of 8.9. Thus, the ozonation results in increased helium/nitrogen selectivities for these sample averaging about 790 percent greater than the helium/nitrogen selectivities measured before ozonation.

TABLE 1

| Sample | P/l Helium | P/l Nitrogen | Selectivity He/N$_2$ | |
|---|---|---|---|---|
| Uncoated Gas Transport Properties | | | | |
| 1 | 132 | 22 | 5.9 | |
| 2 | 149 | 26 | 5.7 | |
| 3 | 152 | 24 | 6.2 | |
| 4 | 147 | 30 | 4.9 | |
| Coated Gas Transport Properties | | | | |
| 5 | 71 | 1.13 | 63 | |
| 6 | 70 | 1.16 | 61 | |
| 7 | 62 | 0.99 | 63 | |
| 8 | 77 | 1.24 | 62 | |
| Ozonated Coated Gas Transport Properties | | | | |
| Sample | P/l Helium | P/l Nitrogen | Selectivity He/N$_2$ | Ratio of Selectivity [Ozonated/ Coated] |
| 5 | 24.5 | 0.044 | 557 | 8.8 |
| 6 | 20.6 | 0.033 | 624 | 10.2 |
| 7 | 23.6 | 0.050 | 472 | 7.5 |
| 8 | 24.7 | 0.044 | 561 | 9.0 |
| | | | Average | 8.9 |

Gas transport properties in the table are expressed as follows:

a) P/l values for each gas (helium and nitrogen) are permeabilities for the gas in units: $10^{-6}$ cm$^3$ cm$^{-2}$ sec$^{-1}$ cmHg$^{-1}$, i.e., $10^{-6}$ cm$^3$ (volume permeated) per cm$^2$ (membrane area) per second (time) per cmHg (pressure differential across the membrane, driving force for transport); [Permeability values for a given gas are measured under indicated conditions of pressure differential and temperature by measuring the amount of gas permeating across the hollow fiber membrane for an appropriate number of fibers of suitable length to provide the indicated membrane area. Fibers are sealed at one end with an impermeable epoxy resin. At the opposite end, the fibers are encapsulated in an epoxy casting with the bores of the hollow fibers open to allow permeated gas to flow out of the bores of the fibers. The epoxy casting provides means of sealing the sample in a pressure vessel into which pressurized test gas is introduced. Thus the quantity of permeated gas exiting the open bores of the hollow fibers is measured under indicated conditions of pressure differential, temperature and membrane area for each gas.]

b) Selectivity $He/N_2$ for the gas pair (helium and nitrogen) equals the numerical ratio of permeability values for the two permeating gases, i.e., for a given sample:

*Selectivity $He/N_2$=[P/l Helium] divided by [P/l Nitrogen];* c) Ratio of Selectivity [Ozonated/Coated] for a given sample is the numerical ratio of the selectivity values of that coated sample [after ozonation] divided by [before ozonation], i.e., Ratio of Selectivity [Ozonated/Coated] =

[Selectivity $He/N_2$ ozonated coated]
divided by
[Selectivity $He/N_2$ unozonated coated]; and d) average Ratio of Selectivity [Ozonated/Coated] equals the numerical sum of the Ratio for individual samples divided by the number of samples.

EXAMPLE 2

This example illustrates ozonation of porous and nonporous hollow fiber membranes which do not include a coating applied prior to or present on the membrane during the ozonation.

Polysulfone asymmetric hollow fiber membranes and samples thereof were prepared and tested, as described in Example 1, for helium and nitrogen gas transport properties uncoated. Uncoated samples 1–4 were porous, as indicated by the low selectivity $He/N_2$ values for these samples (Table 1, Example 1).

Uncoated Samples 1–4 were ozonated using the same conditions indicated for ozonation of samples 5–8 in Example 1. After ozonation of the uncoated samples 1–4, helium and nitrogen gas transport properties were retested. Test results shown in Table 2A indicate that ozonation of porous samples 1–4 alters the permeabilities for both gases, however the low selectivity $He/N_2$ values indicate that the ozonated uncoated membranes are still porous.

TABLE 2A

| Sample | P/l Helium | P/l Nitrogen | Selectivity $He/N_2$ |
|---|---|---|---|
| Uncoated Gas Transport Properties | | | |
| 1 | 132 | 22 | 5.9 |
| 2 | 149 | 26 | 5.7 |
| 3 | 152 | 24 | 6.2 |
| 4 | 147 | 30 | 4.9 |
| Ozonated Uncoated Gas Transport Properties | | | |
| 1 | 49 | 11 | 4.5 |
| 2 | 59 | 12 | 4.9 |
| 3 | 67 | 17 | 3.9 |

TABLE 2A-continued

| Sample | P/l Helium | P/l Nitrogen | Selectivity $He/N_2$ |
|---|---|---|---|
| 4 | 30 | 8 | 3.8 |

After ozonation and retesting, ozonated uncoated samples 1–4 were coated, as described for samples 5–8 in Example 1, then tested for helium and nitrogen gas transport properties. The results of those tests are shown in Table 2B. po These results indicate that ozonation of the polysulfone polymer material of the membrane results in increased selectivity. Coating of the porous membrane after ozonation simply plugs the pores in the porous membrane by occluding contact of the deposited coating material.

The resultant coated ozonated membrane exhibits significantly increased selectivity for the test gas pair (helium and nitrogen), as compared with coated unozonated membranes of the same type (see Example 1, coated samples 5–8 tested before ozonation). The coated ozonated samples 1–4 in Table 2B show increased selectivity $He/N_2$ with an average value of 241 for the four samples. This compares to the measured values of selectivity $He/N_2$ for unozonated coated samples 5–8 (in Table 1, Example 1) of about 62. Thus the average measured selectivity of 241 for coated ozonated samples 1–4 (table 2B) is 3.9 times the selectivity expected based on coated unozonated samples 5–8 (Table 1). This represents an increase in helium/nitrogen selectivity of about 290 percent resulting from ozonation.

These results indicate that ozonation significantly increased the selectivity of the membrane compared to the intrinsic selectivity of the glassy polymer material of the membrane, which for polysulfone with respect to the test gases helium and nitrogen is about 63 at test temperature.

TABLE 2B

| | Coated Ozonated Gas Transport Properties | | |
|---|---|---|---|
| Sample | P/l Helium | P/l Nitrogen | Selectivity $He/N_2$ |
| 1 | 21.8 | 0.26 | 84 |
| 2 | 28 | 0.07 | 400 |
| 3 | 25.9 | 0.09 | 288 |
| 4 | 9.6 | 0.05 | 192 |
| | | Average | 241 |

Polyimide asymmetric hollow fiber membranes produced by Ube Industries) were assembled into gas transport property test samples 9–12 and tested for helium and nitrogen permeability and selectivity, as described in Example 1. Sample 9 was coated before gas testing, as described in Example 1. Samples 10–12 were not coated. Gas test results for samples 9–12 are shown in Table 2C.

Results in Table 2C. indicate that the polyimide membranes are essentially nonporous, as shown by the almost equivalent measured values of permeability and selectivity for samples 9 (coated) and samples 10–12 (uncoated); i.e. the insensitivity of the gas transport properties to the presence or absence of a coating which plugs pores and imperfections in porous membranes.

TABLE 2C

| | Gas Transport Properties | | |
|---|---|---|---|
| Sample | P/l Helium | P/l Nitrogen | Selectivity $He/N_2$ |
| 9 | 53.7 | 0.16 | 336 |
| 10 | 65.7 | 0.20 | 329 |
| 11 | 56.7 | 0.16 | 354 |

TABLE 2C-continued

| | Gas Transport Properties | | |
|---|---|---|---|
| Sample | P/l Helium | P/l Nitrogen | Selectivity He/N$_2$ |
| 12 | 60.1 | 0.18 | 334 |
| average | 59 | 0.18 | 338 |

After these initial gas tests, ozonation of polyimide membrane samples 9-12 was conducted, as described in Example 1. After ozonation of samples 9-12, helium and nitrogen gas transport properties were retested. Results of the tests are shown in Table 2D.

TABLE 2D

| | Ozonated Gas Transport Properties | | | |
|---|---|---|---|---|
| Sample | P/l Helium | P/l Nitrogen | Selectivity He/N$_2$ | Ratio of Selectivity Ozonated/ Unozonated] |
| 9 | 32.5 | 0.075 | 433 | 1.29 |
| 10 | 38.7 | 0.086 | 450 | 1.37 |
| 11 | 42.8 | 0.082 | 522 | 1.47 |
| 12 | 37.6 | 0.082 | 459 | 1.37 |
| | | | average 466 | average 1.38 |

These result further indicated that ozonation significantly increases the selectivity of the material of the glassy polymer membrane for the test gas pair. This is the case whether the membrane is porous or nonporous.

If the membrane is porous, application of a coating in occluding contact plugs the pores and permits the increased selectivity to be realized.

If the membrane is essentially nonporous, the presence or absence of such a coating has little effect. Thus, it is the material of the glassy polymer membrane, rather than the material of the rubbery coating, which is changed by the ozonation with the result of ozonation being the significantly increased selectivity.

Further, the results in Example 2 indicate that the effect of increasing selectivity resulting from ozonation is not limited to a particular type of glassy polymer membrane material. Materials as different as polysulfone and polyimide show significantly increased selectivities resulting from ozonation.

The results suggest that the response or degree of selectivity increase of different glassy polymer material types to ozonation will differ, depending upon such variables as differences in reactivity of ozone with and the permeation/diffusion of ozone into and through a given polymer material. Ozonation conditions employed here were not optimized for each glassy polymer type, but rather conditions chosen were for screening and testing of ozone's effects on different membranes and membrane materials. Such optimization, for example in terms of conditions such as exposure time and ozone concentration, would be expected to yield further improvements in selectivity for a given glassy polymer material.

EXAMPLE 3

This example illustrates ozonation of various dense film and hollow fiber samples for a variety of glassy polymer membrane materials and demonstrates the increased selectivity resulting for ozonation. Ozonation was conducted on the samples of film and fiber, under conditions indicated in Example 1.

Polyimide hollow fiber membranes were obtained from Ube Industries, as commercially available membranes. Hollow fiber membranes prepared from the following polymer materials: polysulfone (Amoco, Udel P-3500), polyarylsulfone (Amoco, Radel A-100) and polyethersulfone (ICI, Victrex) were fabricated generally as described for polysulfone membranes in Example I, with the following exceptions. Polymer solutions from which fiber membranes were spun for polyarylsulfone comprised 41% polymer by weight dissolved in a mixture of methoxyacetic acid and 1,3-dimethyl-2-imidazolidinone (52.5/47.5 wt/wt ratio), which mixture comprised 59% by weight of the total spinning solution. For polyethersulfone, the spinning solution comprised 42% polymer by weight dissolved in a mixture of N,N-dimethylformamide and propionic acid (74/26 wt/wt ratio), which mixture comprised 58% by weight of the total spinning solution.

Dense films of various polymer materials were prepared by casting of a solution of the polymer in a volatile solvent, followed by evaporation of the solvent to form a thin (typically 10-50 micrometer thickness) pinhole free solid film of the polymer. Typically, casting solutions were prepared by dissolving about 10 percent by weight polymer in 90 percent by weight solvent, filtering the polymer solution through a coarse fritted glass filter, then drawing the polymer solution to a uniform thickness with a casting blade (Gardner casting knife) on the surface of a clean glass plate support. The drawn solution on the glass plate support was immediately placed in a heated (typically at about 25°-160° C., depending on the boiling point of the casting solvent) vacuum oven to evaporate the solvent under reduced pressure (typically at about 0.1-1 atmospheres absolute) for a period of time (2-14 days) sufficient to ensure essentially complete removal of solvent from the solid film. Then after removal of the dense film from the support plate, a circular disk of film (47 mm diameter) was cut from the film, measured using a precision micrometer gauge for thickness determination, then the dense film sample disc was mounted in the test cell for gas transport property tests.

Casting solvents employed for dense film preparation were, as follows: polysulfone (Amoco, Udel P-3500), polyetherimide (GE, Ultem), and poly(2,6-dimethyl)-phenylene oxide (GE, PPO) used chloroform, polyarylsulfone (Amoco, Radel A-100), polyamide-imide (Amoco, Torlon) and polyamide (Dynamit-Nobel Trogamid-T) used N,N-dimethylformamide, ethyl cellulose (Dow Chemical, Ethocel grade Standard 100), polyimide (Ciba-Geigy, XU-218) and polycarbonate (GE, Lexan 101) used methylene chloride, copoly(acrylonitrile/styrene) containing (43 4% acrylonitrile/56.6% styrene) used pyridine, and cellulose acetate (Aldrich) used acetone.

Gas transport property testing of hollow fiber samples was conducted, as indicated in Example 1. Gas transport property testing of dense films samples was conducted, as in Example 1 for fiber samples regarding conditions of pressure differential and temperature, except that the dense film sample area was typically about 10.5 cm$^2$ and that pressurized test gas was supplied to one side of the flat dense film sample while the quantity of permeating gas was measured on the opposite side of the film. Dense film samples were mounted and sealed, using impermeable rubber o-ring gaskets, between two chambers of a pressure vessel, which two chambers provided means of introducing pressurized test gas to the first chamber on one side of the flat film sample and conducted permeated gas to measurement means from the opposite side of the flat film sample in the second chamber.

Table 3A shows gas test results for hollow fiber membrane samples of various glassy polymer membrane materials. With the exception of polyimide (Ube Industries) samples 10-12 (see Example 2), all samples were coated, as in Example 1, prior to ozonation. As indicated in the Table 3A, gas transport tests were conducted before and after ozonation to illustrate the increased selectivity resulting from ozonation.

Permeability (P/1) values for hollow fiber membrane samples were calculated, as described in Example 1. Permeability coefficient (P) values were obtained for flat dense film samples and expressed in the table of this example, as follows:

brane area) per second (time) per cmHg (pressure differential across the film, driving force for transport).

Selectivity values for hollow fiber membrane samples were calculated, as in Example 1. Selectivity values for a given pair of gases for flat dense film samples were calculated as the numerical ratio of measured permeability coefficient values for the respective gases, i.e., for gas A and gas B, Selectivity $A/B = [P\ gas\ A]/[P\ gas\ B]$.

The results shown in Table 3A indicate that ozonation significantly increases the selectivity of asymmetric hollow fiber membranes made from a variety of glassy polymer materials.

TABLE 3A

| Polymer/ Sample | Gas Transport Properties | | | | Ratio of Selectivity [Ozonated/Unozonated] |
|---|---|---|---|---|---|
| | P/1 Helium | | Selectivity He/N$_2$ | | |
| | Unozonated | Ozonated | Unozonated | Ozonated | |
| Polysulfone (Amoco, Udel P-3500) | | | | | |
| 5 | 71 | 24.5 | 63 | 557 | 8.8 |
| 6 | 70 | 20.6 | 61 | 624 | 10.2 |
| 7 | 62 | 23.6 | 63 | 472 | 7.5 |
| 8 | 77 | 24.7 | 62 | 561 | 9.0 |
| | | | | average | 8.9 |
| Polyimide (Ube Industries) | | | | | |
| 9 | 53.7 | 32.5 | 336 | 433 | 1.29 |
| 10 | 65.7 | 38.7 | 329 | 450 | 1.37 |
| 11 | 56.7 | 42.8 | 354 | 522 | 1.47 |
| 12 | 60.1 | 37.6 | 334 | 459 | 1.37 |
| | | | | average | 1.38 |
| Polyarylsulfone (Amoco, Radel A-100) | | | | | |
| 13 | 23.1 | 7.56 | 88 | 283 | 3.22 |
| 14 | 22 | 10.2 | 92 | 318 | 3.46 |
| 15 | 18.9 | 7.67 | 83 | 279 | 3.36 |
| | | | | average | 3.35 |
| Polyethersulfone (ICI, Victrex) | | | | | |
| 16 | 25.4 | 13.3 | 53 | 244 | 4.60 |
| 17 | 24.4 | 14 | 42 | 135 | 3.21 |
| 18 | 25.2 | 13.3 | 49 | 208 | 4.24 |
| | | | | average | 4.02 |

P value for a gas is the permeability coefficient for that gas in the indicated polymer film, in units: $10^{-10}$ cm$^3$ cm cm$^{-2}$ sec$^{-1}$ cmHg$^{-1}$, i.e., $10^{-10}$ cm$^3$ (volume permeated) times cm (film thickness) per cm$^2$ (membrane area) per second (time) per cmHg (pressure differential across the film, driving force for transport).

Table 3B shows results of gas transport property tests on samples of various dense flat films of a variety of glassy polymer materials, comparing the gas transport properties of such films before and after ozonation. These results indicate that ozonation significantly increases selectivity of the materials of the polymer membranes for the test gas pair.

TABLE 3B

| Polymer/ Sample | Gas Transport Properties | | | | Ratio of Selectivity [Ozonated/Unozonated] |
|---|---|---|---|---|---|
| | P Helium | | Selectivity He/N$_2$ | | |
| | Unozonated | Ozonated | Unozonated | Ozonated | |
| Polysulfone (Amoco, Udel P-3500) | | | | | |
| 19 | 12.5 | 11.3 | 60.4 | 157 | 2.60 |
| 20 | 17.4 | 16.5 | 62.1 | 107 | 1.72 |
| 21 | 14.7 | 12 | 58.8 | 112 | 1.90 |
| | | | | Average | 2.07 |
| Polyarylsulfone (Amoco, Radel A-100) | | | | | |
| 22 | 8.18 | 7.05 | 73 | 140 | 1.92 |
| Ethyl Cellulose (Dow, Ethocel grade Standard 100, | | | | | |

TABLE 3B-continued

Gas Transport Properties

| Polymer/ | P Helium | | Selectivity He/N$_2$ | | Ratio of Selectivity |
|---|---|---|---|---|---|
| Sample | Unozonated | Ozonated | Unozonated | Ozonated | [Ozonated/Unozonated] |
| 48–49.5% acetyl) | | | | | |
| 23 | 39.1 | 33.5 | 12.3 | 35.9 | 2.92 |
| 24 | 45.8 | 38 | 11.4 | 25.6 | 2.25 |
| 25 | 41.1 | 33.5 | 13.3 | 27.2 | 2.05 |
| | | | | Average | 2.41 |
| Polyetherimide (GE, Ultem) | | | | | |
| 26 | 8.28 | 7.82 | 148 | 195 | 1.32 |
| Polyimide (Ciba-Geigy, XU-218) | | | | | |
| 27 | 31.9 | 28 | 68.4 | 127 | 1.86 |
| Polycarbonate (GE, Lexan 101) | | | | | |
| 28 | 11.3 | 10.7 | 36.3 | 49.3 | 1.36 |
| Copoly(acrylo-nitrile/styrene, 43.4% AN/56.6% styrene) | | | | | |
| 29 | 8.15 | 7.90 | 296 | 362 | 1.22 |
| Poly(2,6-dimethyl)-phenylene oxide (GE, PPO) | | | | | |
| 30 | 95.6 | 78.4 | 28 | 171 | 6.11 |
| Polyamide-imide (Amoco, Torlon) | | | | | |
| 31 | 3.05 | 2.76 | 161 | 175 | 1.09 |
| Polyamide (Dynamit-Nobel, Trogamid-T) | | | | | |
| 32 | 4.52 | 4.30 | 479 | 508 | 1.06 |
| Cellulose Acetate (Aldrich, 39.8% acetyl content) | | | | | |
| 33 | 16.9 | 16.6 | 109 | 119 | 1.09 |

These results indicate that ozonation can significantly increase the selectivity of a wide variety of glassy polymer materials of interest for use in membranes. As discussed in relation to Example 2, various materials respond to a given degree of ozonation (i.e. ozonation conditions, such as ozone concentration, treatment time, etc.) to differing degrees or extents. Thus, the results in Table 3B, which show that different glassy polymer materials show varying degrees of selectivity increase resulting from ozonation at a given set of treatment conditions, indicate that optimum conditions for obtaining significant increases in selectivity by ozonation will be different for different materials, i.e. a given material will require a particular optimum condition of ozonation treatment (ozone concentration, treatment time, temperature, pressure, and the like) to yield optimum increase in selectivity for a given gas pair separation.

Several important unexpected and exceptionally unique aspects of the invention are illustrated in Table 3B. It is noted that the intrinsic selectivities for many polymers are increased to an extraordinary degree by exposure to ozone with very little loss in fast gas permeability. For example, the selectivity for PPO increases to 171 (a factor of more than 6) with only an 18% decrease in PHe. Under such conditions, this modified PPO film had 3 times the selectivity of Udel with almost 7 times Udel's permeability. It is precisely the tradeoff between P and selectivity which those skilled in the art are well aware is a major problem that the present invention addresses. This same trend is seen in the results of treating polysulfones, polyimides, ethyl cellulose and other polymers.

The results in Tables 3A and 3B on asymmetric hollow fibers and on dense films make it obvious to someone skilled in the art of separation membranes that ozonation can significantly increase selectivity of a glassy polymer material in any of the configurations employable for construction of separating membranes, i.e. whether the material of the membrane is configured as the separating layer of an integrally skinned asymmetric membrane, as the separating layer of a dense membrane or as the separating layer of a conventional composite membrane where the glassy polymer material is a layer supported by some other underlying structure, such as a porous support. Ozonation can be used to significantly increase the selectivity of the material of the glassy polymer membrane configured in the various forms, including flat sheets, such as can be employed in plate-and-frame separator devices or in spiral wound separator devices, or in hollow fiber separator devices. And most importantly, such increases in selectivity can be achieved without undue loss of permeability for the desired gas.

Table 3C shows the results of gas transport property tests on flat dense film samples of various silicone-containing rubbery polymer materials, before and after ozonation, which materials are typical of materials of coatings employed to plug minor imperfections or pores in separating layers of membranes for construction of resistance model composite membranes. The results indicate that ozonation of these rubbery silicone-containing polymer materials, under the same conditions of ozonation which afford significant increases in selectivity for materials of the polymer membranes, apparently do not significantly increase selectivity for these rubbery polymer materials commonly employed for coatings in construction of resistance model composite membranes. Thus, these results support and demonstrate that, while reaction is indeed occurring in such films (note the decreases in permeability), polymers in their rubbery state do not exhibit the increased selectivity seen in glassy polymers and show that the increases in selectivity are not inherent in ozone or oxidative treatment of polymers or even films and membranes in the solid state, but are expected only when the conditions of the invention are practiced and employed.

adhesive, which adhesive permitted adherence of the nonstick sheet to the glass plate. The nonstick sheets were produced commercially (Chemplast, Inc., Bytac Type VF-81). The cross-linked poly(dimethyl-siloxane) film sample also employed these nonstick sheets as the surface onto which the film was cast.

EXAMPLE 4

This example illustrates that the ozonated glassy polymer material which exhibits increased selectivity resulting from ozonation is in a nonequilibrium state, another important and unique aspect of the invention. This example illustrates that the nonequilibrium state within the glassy polymer, which state has been created

TABLE 3C

| Polymer/ Sample | Gas Transport Properties | | | | Ratio of Selectivity [Ozonated/Unozonated] |
|---|---|---|---|---|---|
| | P Helium | | Selectivity He/$N_2$ | | |
| | Unozonated | Ozonated | Unozonated | Ozonated | |
| Poly(dimethyl-siloxane) (Dow-Corning, Sylgard 184) | | | | | |
| 34 | 373 | 348 | 1.53 | 1.49 | 0.97 |
| Crosslinked Poly(dimethyl-siloxane) (Petrarch Systems, A-1100 Aminopropyl-triethoxysilane + PDMS-diol prepolymer) | | | | | |
| 35 | 261 | 240 | 1.45 | 1.44 | 0.99 |

The silicone-containing rubbery polymer samples were ozonated and gas tested, as indicated in example 3 above. The preparation of these rubbery sample films was as indicated in example 3 above, with the exception that casting solution preparation for the cross-linked poly(dimethyl-siloxane) used cyclohexane solvent and the casting solution was comprised of 25 percent polymer (weight/volume) in the cyclohexane solvent. The poly(dimethyl-siloxane) sample (Dow Corning, Sylgard 184) used no solvent. It was prepared by mixing and reacting two components provided by Dow Corning following the manufacturers procedures, which components comprise a first component A which is a silicone rubber prepolymer and a second component B which is a curing catalyst. Components A and B are mixed in a ratio of 10 parts by weight A to one part by weight B. The resulting mixture was then cast as described in Example 3 above to form the dense film sample of this material, with the exception that the glass plate onto which the films were cast had a nonstick sheet on its surface, which sheet comprised the casting surface onto which the silicone-containing rubbery polymer casting solutions were drawn. The nonstick sheet used was comprised of a surface layer 25 micrometers thick of fluorinated polymer (DuPont, Teflon FEP) supported on a vinyl polymer support layer 200 micrometers thick and backed with a bottom layer of pressure-sensitive by ozonation, can relax when the ozonated polymer material is heated sufficiently to permit polymer chains in the solid to more freely move with respect to one another and thereby reorient or rearrange their conformations and configurations. Such rearrangements lead to a relaxation of the nonequilibrium state to a state closer to equilibrium in the solid polymer sample.

Gas transport property tests, the results of which tests are shown in Table 4A, were conducted on dense film samples and the results shown in Table 4B were obtained in tests conducted on hollow fiber samples of polysulfone (Amoco, Udel P-3500). The samples were prepared and gas tested then ozonated and retested, as described in Examples 1 and 3, with the exception that the polysulfone hollow fiber sample in Table 4B was ozonated using 1 weight percent ozone for a treatment time of 0.5 hours. Relaxation of the polysulfone film samples was the result of heating the ozonated samples to 130° C. for 2 hours in an air gas atmosphere while the fiber was in a nitrogen atmosphere. Relaxation of a first ethyl cellulose dense film sample was the result of heating the ozonated film to 80° C. for 2 hours in an air gas atmosphere. A second ethyl cellulose dense film, sample number 24 in Table 4A, was heated for 2 hours at 100° C. in an air gas atmosphere, tested, and then heated for 2 hours at 140° C. in an air gas atmosphere and retested.

TABLE 4A

| Polymer/ Sample | Gas Transport Properties | | | | Ratio of Selectivity [Ozonated/Unozonated] |
|---|---|---|---|---|---|
| | P Helium | | Selectivity He/$N_2$ | | |
| | Unozonated | Ozonated | Unozonated | Ozonated | |
| Polysulfone (Amoco, Udel P-3500) | | | | | |
| 20 | | | | | |

TABLE 4A-continued

| Polymer/ | P Helium | | Selectivity He/N$_2$ | | Ratio of Selectivity |
|---|---|---|---|---|---|
| Sample | Unozonated | Ozonated | Unozonated | Ozonated | [Ozonated/Unozonated] |
| Before Ozonation | 17.4 | | 62.1 | | |
| After Ozonation | | | 16.5 | | 1071.72 |
| After Relaxation | | 15.9 | | 68.5 | 1.10 |
| Ethyl Cellulose (Dow, Ethocel grade Standard 100, 48–49.5% acetyl) | | | | | |
| 25 | | | | | |
| Before Ozonation | 41.1 | | 13.3 | | |
| After Ozonation | 33.5 | | 27.2 | | 2.05 |
| After Relaxation | | 37.3 | | 24.4 | 1.83 |
| 24 | | | | | |
| Before Ozonation | 45.8 | | 11.4 | | |
| After Ozonation | | 38.0 | | 25.6 | 2.25 |
| After Heating 2 hours at 100° C. | | 36.8 | | 28.0 | 2.46 |
| After Further Heating 2 hours at 140° C. | | 40.2 | | 17.9 | 1.57 |

TABLE 4B

| Polymer/ | P/l Helium | | Selectivity He/N$_2$ | | Ratio of Selectivity |
|---|---|---|---|---|---|
| Sample | Unozonated | Ozonated | Unozonated | Ozonated | [Ozonated/Unozonated] |
| Polysulfone (Amoco, Udel P-3500) | | | | | |
| 36 | | | | | |
| Before Ozonation | 74.4 | | 51 | | |
| After Ozonation | | 34.6 | | 82 | 1.61 |
| After Relaxation | | 30.9 | | 40 | 0.78 |
| Recoated after Relaxation | | 28.5 | | 57 | 1.12 |

The relatively low selectivity (40) of the polysulfone hollow fiber sample after relaxation, as shown in Table 4B may be due in part to ineffective coating or the coating effectiveness degrading somewhat as a result of the high temperature treatment employed to bring about relaxation.

After the relaxation and subsequent gas transport property test, this sample was recoated, as described for coating procedures in Example 1, then was retested for gas transport properties. The results are shown in Table 4B, designated as "recoated after relaxation", and indicate that the high temperature treatment reduced selectivity He/N$_2$ from 82 after ozonation to 57 after relaxation and recoating, where the recoating essentially eliminated concerns that the lower selectivity resulting from relaxation of the ozonated sample was due to inefficiencies of the coating.

However, the relaxation results of the films and fibers samples do show that the increased selectivity resulting from ozonation is reduced, when the ozonated glassy polymer in its nonequilibrium state is heated to thermally induce freer molecular movement and reorientation of polymer chains in the solid state. Thus, the nonequilibrium state created by ozonation is relaxed toward an equilibrium state which does not exhibit the increased selectivity which characterizes the nonequilibrium state.

The relaxation of the nonequilibrium state in the ozonated glassy polymer material and resultant decrease in the relatively high selectivity of the ozonated material for a test gas pair may also be achieved by other means of inducing freer polymer chain motions, thereby permitting reorganization and reorientation which leads to an approach toward an equilibrium state and lower selectivities in gas transport property tests. Another experimentally convenient means of achieving such relaxation is by exposure of the ozonated glassy polymer material and ozonated membrane samples to plasticizing agents.

Plasticizing agents, such as various low molecular weight organic compounds, typically dissolve to some degree in the solid polymer material, but are not strong solvents for the polymer material, and lead to effects similar to thermal effects discussed above in this Example, with respect to increasing polymer chain motions and facilitating reorganization and reorientation leading to the relaxation of a nonequilibrium state, as results from ozonation, toward an equilibrium state of the solid polymer material. It is well known that a plasticizer has the effect of lowering the Tg of a glassy polymer. Thus, it is expected that exposure of the membrane to a plasticizer of sufficient strength should have the same effect as increasing the temperature (i.e., the polymer will be closer to its Tg than in the unplasticized state).

Table 4C shows the results of gas transport property tests conducted on ozonated samples of polysulfone (Amoco, Udel P-3500) hollow fiber membranes, which were exposed to the plasticizing effects of toluene in a liquid mixture with hexane (7% toluene/93% hexane, by volume). Samples were prepared, ozonated and tested as described in Example 1, with the following exceptions.

Ozonation of uncoated hollow fiber membranes was conducted at 0.4 percent ozone for a treatment time of 1 hour. After ozonation, the samples were baked at 75° C. for about 16 hours in a nitrogen atmosphere. Samples were immersed in the toluene/hexane liquid mixture for 16 hours at about 25° C., then the toluene and hexane were evaporated in a vacuum oven at about 35°–40° C. under reduced pressure of about 0.1 atmospheres absolute for about 4 hours. Samples were then coated to ensure that any changes in selectivity observed in subsequent gas transport property tests were reflective of the selectivity characteristics of the material of the polymer membrane and not due to potential dissolving and removal of the occluding coating material from pores, imperfections or surface of the membrane samples by solvent action of the liquid toluene/hexane mixtures, which mixtures are known to be strong solvents with respect to materials of the occluding coatings.

Comparison ozonated samples, unplasticized, were prepared in the same manner, except that these comparison samples were not exposed to the toluene/hexane mixture. Thus, gas transport property test results shown in Table 4C provide a comparison of plasticized ozonated polysulfone hollow fiber membrane samples, which were exposed to the effects of toluene plasticization as a mode of relaxation, with unplasticized ozonated samples of the same membranes, which were not exposed to such plasticization/relaxation effects.

TABLE 4C

Gas Transport Properties

| Polymer/ Sample | P/l Helium | Selectivity He/$N_2$ | Ratio of Selectivity [Unplasticized/ Plasticized] |
|---|---|---|---|
| After Plasticization | 33 | 53 | 2.81 |
| Before Plasticization | 33 | 149 | |
| Non-Ozonated Before Plasticization | 67 | 53 | 1.10 |
| Non-Ozonated After Plasticization | 60 | 48 | |

The results in Table 4C indicate that plasticization can bring about the relaxation of the ozonated glassy polymer material, to yield a reduction in the high selectivity resulting from ozonation, similar in effect to the relaxation brought about by high temperature thermal treatments of the ozonated glassy polymer material. Plasticization, temperature changes, even dissolution and recasting will not change the chemical nature and equilibrium selectivity and intrinsic permeability of a polymer. While there are some differences often measured in films depending on casting techniques and solvents used, these effects are generally small (less than 25% in permeability and even less in selectivity).

It is an essential part of the invention described herein that relaxation as described in this example will alter the treatment of the invention, and that the measured selectivity of the modified preformed membranes of the invention is not the inherent selectivity of the polymer which was modified or of the modified polymer, but is unique to the unrelaxed nonequilibrium state of the membrane of the invention.

It is anticipated that the chemical nature of the polymer material and the specific chemistry occurring during the oxidation process will affect and influence the conditions under which the relaxation, of the nonequilibrium state and the observed high selectivity, will occur. For example, where cross-linking reactions can be or are promoted, it might be expected that relaxation might be more difficult to induce, requiring, for example, higher temperature or higher degree of plasticization to induce relaxation. For example, relaxation might be expected to occur at temperatures within about 50° C. of the polymer's glass transition temperature (Tg). However, since the chemistry occurring during the oxidation and some extent of cross-linking reactions occurring concurrently with the oxidation treatment or subsequently, such as during bake or heating, might be expected to alter the Tg of the polymer material, determination of specific temperatures or other conditions, where relaxation occurs, must be made for each polymer material and for each oxidation treatment condition, where different extents of reaction and resultant selectivity increase may be achieved.

EXAMPLE 5

This example illustrates the increased selectivity resulting from ozonation of polysulfone (Amoco, Udel P-3500) membranes with respect to separation of various pairs of gases.

Table 5A shows gas transport property test results on a flat dense film sample, prepared, ozonated and tested as described in Example 3, with the exception that in the case of results for the gas pair of oxygen and nitrogen, testing employed air (a mixture of about 21% $O_2$/79% $N_2$ by volume) and that the permeated gas in the test was analyzed for $O_2$ and $N_2$ composition using gas chromatography to determine the relative fractions of permeate gas quantity due to each component.

Table 5A shows results for gas transport property tests on a hollow fiber sample, prepared ozonated and tested as described in Example 1, with the exception that the sample contained sufficient fibers to comprise about 4,100 $cm^2$ of membrane area, ozonation was conducted at a concentration of 1 weight percent ozone for a treatment time of 0.5 hours, and after the ozonation the sample was baked for 14 hours at a 60° C. in a nitrogen gas atmosphere.

TABLE 5A

Gas Transport Properties

| Sample | Unozonated | Ozonated | Unozonated | Ozonated | Ratio of Selectivity [Ozonated/Unozonated] |
|---|---|---|---|---|---|
| Dense Film 19 | P Helium 12.5 | 11.3 | Selectivity He/$N_2$ 60.4 | 157 | 2.60 |
| Dense Film 19 | P Oxygen 1.31 | 0.613 | Selectivity $O_2$/$N_2$ 6.36 | 8.50 | 1.34 |
| Hollow Fiber 37 | P/l Helium 157 | 87 | Selectivity He/$N_2$ 56 | 218 | 3.89 |
| Hollow Fiber 37 | P/l Hydrogen 169 | 72 | Selectivity $H_2$/$CH_4$ 54 | 149 | 2.76 |
| Hollow Fiber 37 | P/l Hydrogen 169 | 72 | Selectivity $H_2$/$N_2$ 60 | 180 | 3.00 |
| Hollow Fiber | P/l Helium | | Selectivity He/$CH_4$ | | |

TABLE 5A-continued

Gas Transport Properties

| Sample | Unozonated | Ozonated | Unozonated | Ozonated | Ratio of Selectivity [Ozonated/Unozonated] |
|---|---|---|---|---|---|
| 37 | 157 | 87 | 50 | 181 | 3.62 |

Table 5B shows results for gas transport property tests on polysulfone (Amoco, Udel P-3500) hollow fiber samples, prepared and tested as described in Example 1, with the exception that the samples contained sufficient fibers to comprise about 4,000 cm$^2$ of membrane area and gas transport property tests were conducted in the temperature range of 30°–34° C. For the ozonated sample, ozonation was conducted at an ozone concentration of about 0.2 percent by weight in an air carrier gas for a treatment time of 2 hours, and after ozonation the sample was baked for about 17 hours at about 75° C. in a nitrogen gas atmosphere. Then after the bake, the sample was recoated, as described for coating procedures in Example 1. For the unozonated control samples, hollow fiber from the same production run as for the ozonated sample was used. Results in Table 5B compare the carbon dioxide, helium and hydrogen gas transport properties of unozonated control samples and an ozonated sample.

TABLE 5B

Gas Transport Properties

| Sample | P/l He | P/l H$_2$ | P/l CO$_2$ | He/Co$_2$ | Selectivity H$_2$/CO$_2$ |
|---|---|---|---|---|---|
| Unozonated Controls | | | | | |
| A | 145 | 172 | NM | NM | NM |
| B | 166 | NM | 54 | 3.07 | NM |
| Ozonated Sample Before Ozonation | 155 | NM | NM | NM | NM |
| Ozonated Sample After Ozonation | 77 | 56 | 9.36 | 8.23 | 5.98 |

The results in Table 5B illustrate that ozonation significantly increases selectivity for the gas pair helium/carbon dioxide, compared to unozonated controls. The ozonated sample after ozonation showed a selectivity He/CO$_2$ of 8.23, compared to the unozonated control sample B selectivity He/CO$_2$ of 3.07. This corresponds to an increase in selectivity He/CO$_2$ of about 168 percent resulting from ozonation.

The results for the ozonated sample measured before ozonation showed a P/l He value essentially identical to the average of the two control samples, 155 and 156 respectively. Although not measured (as indicated in Table 5B by the notation "NM"), the selectivity H$_2$/CO$_2$ for the two unozonated controls are estimated to be about 3.19. This value was estimated by dividing P/l H$_2$ by P/l CO$_2$, as described for calculating selectivity in Example 1, using the P/l H$_2$ value (172) measured on control sample A by the P/l CO$_2$ value (54) measured on control sample B. Comparison of this estimate of selectivity H$_2$/CO$_2$ for unozonated controls with the measured selectivity H$_2$/CO$_2$ of 5.98 for the ozonated sample after ozonation illustrates that ozonation significantly increases selectivity for the hydrogen/carbon dioxide gas pair. Based on these values, the increase resulting from ozonation corresponds to about 87 percent.

The results in Table 5A and 5B, as well as those of Table 3, illustrate that the permeabilities (P/l) and permeability coefficients (P) of relatively small molecules are decreased much less that those of relatively large molecules, for membrane samples ozonated under the same ozonation treatment conditions. For example, one indicative measure of relative molecular size is obtained by comparison of the molecular weight of the permeant molecules.

Results for dense film sample 19 in Table 5A shows that P He (helium, molecular weight 4 grams/mole) decreased by about 9.6% (from 12.5 to 11.5), while P O$_2$ (oxygen, molecular weight 32 grams/mole) decreased by about 53% (from 1.31 to 0.613) for the indicated ozonation treatment conditions. Similar trends as evident from results in Table 5B, where hollow fiber samples showed the following for helium and carbon dioxide (CO$_2$, molecular weight 44 grams/mole): ozonation decreased P/l He by about 50% (from 155 before ozonation to 77 after ozonation), while P/l CO$_2$ decreased about 80% (from about 54 in the unozonated control sample B to 9.36 after ozonation).

Noteworthy, beyond the instant interest in selectivity increases resulting from ozonation, as may be applicable to enhancing the characteristics of polymer materials for use in membrane separations of gases, the results show that various gases of interest in applications of polymer materials in the form of films, such as the polymer material's barrier properties with respect to atmospheric gases (e.g. carbon dioxide, oxygen and nitrogen), also appear to be enhanced by ozonation.

For example, it is known that polymer films employed for packaging of foodstuffs and other relatively perishable items are commonly most effective when the polymer material of the film used to package the perishable items is relatively impermeable to such atmospheric gases. To maintain integrity or improve the storage life of the perishable items, such packaging films may be chosen to limit or prevent permeation of one or more gases into the package through the film, or the film, in certain instances, may be chosen to maintain, in the interior of the package, some relatively stable environment of a gas or mixture of gases, which gas or mixture of gases may be intentionally introduced in the packaging process to enhance some characteristic of the perishable item. For example, it is known to be desireable to maintain a carbon dioxide containing gas in the packaging of certain meats, so that the acidity of the moist surface of the meat is somewhat enhanced, permitting the meat to maintain its natural reddish coloration for longer periods of time than would otherwise be possible. In either case, relatively impermeable films are desired. Thus, it appears that ozonation provides a way to reduce the permeation of gases through a particular polymer material to improve its gas barrier characteristics.

Results in the present Example illustrate, with respect to at least one polymer material, polysulfone, that ozonation reduces the permeation of a variety of gases compared to unozonated polysulfone. Particularly interesting, in the context of barrier property enhancements resulting from ozonation, are the changes in permeation of atmospheric gases, such as carbon dioxide, oxygen and nitrogen gases. For example, though not optimized for such barrier property enhancements, polysulfone, when ozonated, exhibits significantly reduced transport properties (permeabilities and permeability coefficients) for carbon dioxide, oxygen and nitrogen. However, $N_2$ is generally considered to be about 0.2 Å larger in molecular radius than is $O_2$, and we do observe significant increases in $O_2/N_2$ selectivity for a number of polymers.

In addition, though lesser reductions in transport properties are observed for ozonated polysulfone for gases of smaller molecular size, such as helium and hydrogen, the results suggest that ozonation would reduce permeation properties of polysulfone to some significant degree for other gases and vapors. Regarding a polymer material's barrier properties for applications involving packaging, the present results suggest that ozonation would effect improvements in the material's barrier properties with respect to transport of water vapor. From the results for both smaller and larger gaseous molecular species, one would expect that water vapor transport properties may be enhanced in the context of a given polymer material's barrier properties.

As illustrated in the next Example 6, a variety of polymer materials show similar responses, as does polysulfone, to ozonation, regarding the changes brought about by ozonation in the transport properties of the polymer materials with respect to a variety of permeating gases. Considerations analogous to those just discussed for barrier properties of polysulfone are expected to apply to a wide range of polymer materials.

EXAMPLE 6

This example illustrates the increased selectivity resulting from ozonation of a variety of glassy polymer material membranes for a variety of gas pairs, as was shown for polysulfone in Example 5. All samples were prepared, ozonated and gas transport property tested as described in Examples 3 and 5.

TABLE 6

| Sample | Gas Transport Properties | | | | Ratio of Selectivity [Ozonated/Unozonated] |
|---|---|---|---|---|---|
| | Unozonated | Ozonated | Unozonated | Ozonated | |
| Polyarylsulfone (Amoco, Radel A-100) | | | | | |
| Dense Film | P Helium | | Selectivity He/$N_2$ | | |
| 22 | 8.18 | 7.05 | 73 | 140 | 1.92 |
| Dense Film | P Oxygen | | Selectivity $O_2/N_2$ | | |
| 22 | 0.553 | 0.387 | 6.78 | 7.74 | 1.14 |
| Hollow Fiber | P/l Helium | | Selectivity He/$N_2$ | | |
| 13 | 23.1 | 7.56 | 88 | 283 | 3.22 |
| 14 | 22 | 10.2 | 92 | 318 | 3.46 |
| 15 | 18.9 | 7.67 | 83 | 279 | 3.36 |
| | | | | average | 3.35 |
| Ethyl Cellulose (Dow, Ethocel grade Standard 100, 48–49.5% acetyl) | | | | | |
| Dense Film | P Helium | | Selectivity He/$N_2$ | | |
| 23 | 39.1 | 33.5 | 12.3 | 35.9 | 2.92 |
| 24 | 45.8 | 38 | 11.4 | 25.6 | 2.25 |
| 25 | 41.1 | 33.5 | 13.3 | 27.2 | 2.05 |
| Dense Film | P Oxygen | | Selectivity $O_2/N_2$ | | |
| 23 | 11.8 | 4.95 | 3.68 | 5.31 | 1.44 |
| 24 | 13.5 | 6.07 | 3.33 | 4.08 | 1.23 |
| 25 | 11.5 | 5.56 | 3.74 | 4.51 | 1.21 |
| Polyetherimide (GE, Ultem) | | | | | |
| Dense Film | P Helium | | Selectivity He/$N_2$ | | |
| 26 | 8.28 | 7.82 | 148 | 195 | 1.32 |
| Dense Film | P Oxygen | | Selectivity $O_2/N_2$ | | |
| 26 | 0.462 | 0.367 | 8.24 | 9.13 | 1.10 |
| Polyimide (Ciba-Geigy, XU-218) | | | | | |
| Dense Film | P Helium | | Selectivity He/$N_2$ | | |
| 27 | 31.9 | 28 | 68.4 | 127 | 1.86 |
| Dense Film | P Oxygen | | Selectivity $O_2/N_2$ | | |
| 27 | 2.89 | 1.51 | 6.40 | 7.10 | 1.11 |
| Polycarbonate (GE, Lexan 101) | | | | | |
| Dense Film | P Helium | | Selectivity He/$N_2$ | | |
| 28 | 11.3 | 10.7 | 36.3 | 49.3 | 1.36 |
| Dense Film | P Oxygen | | Selectivity $O_2/N_2$ | | |
| 28 | 1.57 | 1.46 | 5.30 | 5.61 | 1.06 |
| Copoly(acrylonitrile/styrene, 43.4% AN/56.6% styrene) | | | | | |
| Dense Film | P Helium | | Selectivity He/$N_2$ | | |
| 29 | 8.15 | 7.90 | 296 | 362 | 1.22 |
| Dense Film | P Oxygen | | Selectivity $O_2/N_2$ | | |
| 29 | 0.241 | 0.217 | 8.99 | 9.48 | 1.05 |

TABLE 6-continued

| Sample | Gas Transport Properties | | | | Ratio of Selectivity [Ozonated/Unozonated] |
|---|---|---|---|---|---|
| | Unozonated | Ozonated | Unozonated | Ozonated | |
| Poly(2,6-dimethyl)-phenylene oxide (GE, PPO) | | | | | |
| Dense Film 30 | P Helium 95.6 | 78.4 | Selectivity He/N$_2$ 28 | 171 | 6.11 |
| Dense Film 30 | P Oxygen 16.3 | 3.85 | Selectivity O$_2$/N$_2$ 4.90 | 8.15 | 1.66 |
| Polyamide-imide (Amoco, Torlon) | | | | | |
| Dense Film 31 | P Helium 3.05 | 2.76 | Selectivity He/N$_2$ 161 | 175 | 1.09 |
| Dense Film 31 | P Oxygen 0.112 | 0.099 | Selectivity O$_2$/N$_2$ 5.83 | 5.98 | 1.03 |
| Polyamide (Dynamit-Nobel Trogamid-T) | | | | | |
| Dense Film 32 | P Helium 4.52 | 4.30 | Selectivity He/N$_2$ 479 | 508 | 1.06 |
| Dense Film 32 | P Oxygen 0.0838 | 0.0767 | Selectivity O$_2$/N$_2$ 8.89 | 9.07 | 1.02 |

As discussed in Example 3, with respect to the degree of increase in selectivity for a given gas pair resulting from ozonation at a given set of treatment conditions for different glassy polymer materials, other gas pairs show variations in the degree of increased selectivity for a given glassy polymer material In Table 6, for example, two gases of similar molecular dimensions, such as oxygen and nitrogen gases, generally show lower degrees of selectivity increase resulting from ozonation of the various glassy polymer materials compared to generally larger increases in selectivity resulting from ozonation of the given glassy polymer material for the gas pair helium and nitrogen, which are more different in molecular dimensions than are oxygen and nitrogen.

In many different glassy polymer materials, significant increases in selectivity do occur for a variety of gas pairs as a result of ozonation. As discussed, in relation to results in Example 3, for optimization of ozonation conditions for different glassy polymer materials for a given gas pair separation, it is obvious that a given gas pair separation of interest will benefit from optimization of ozonation conditions used for a given glassy polymer material, which may be employed for that gas pair separation.

EXAMPLE 7

This example illustrates the increased selectivity resulting from ozonation of polysulfone (Amoco, Udel P-3500) membranes with respect to separation of a test gas pair, where ozonation conditions are varied to examine the effects of treatment concentration, exposure time and treatment temperature.

Table 7A shows results for gas transport property tests on hollow fiber samples, prepared, ozonated and tested as described in Example 1, with the exception that treatment time was either 2 hours, 1 hour or 0.5 hours at ozone concentration in the range of 5.35.7 percent by weight at about 20°–25° C. treatment temperature.

TABLE 7A

| Sample | Treatment Time (hr) | Gas Transport Properties | | | | Ratio of Selectivity [Ozonated/Unozonated] |
|---|---|---|---|---|---|---|
| | | P/l Helium | | Selectivity He/N$_2$ | | |
| | | Unozonated | Ozonated | Unozonated | Ozonated | |
| 38 | 2 | 82 | 16.2 | 58 | 360 | 6.21 |
| 39 | 2 | 93 | 13.7 | 50 | 303 | 6.06 |
| 40 | 2 | 94 | 17.3 | 54 | 410 | 7.59 |
| 41 | 2 | 100 | 14.6 | 45 | 212 | 4.71 |
| | | | | | average | 6.14 |
| 42 | 1 | 85 | 17.9 | 64 | 230 | 3.59 |
| 43 | 1 | 62 | 11.6 | 49 | 298 | 6.08 |
| 44 | 1 | 66 | 8.6 | 54 | 208 | 3.85 |
| 45 | 1 | 95 | 4.9 | 51 | 158 | 3.10 |
| | | | | | average | 4.16 |
| 46 | 0.5 | 84 | 26.4 | 62 | 267 | 4.30 |
| 47 | 0.5 | 97 | 28.5 | 55 | 288 | 5.24 |
| 48 | 0.5 | 89 | 29.1 | 60 | 244 | 4.07 |
| 49 | 0.5 | 104 | 32.4 | 54 | 193 | 3.57 |
| | | | | | average | 4.30 |

Table 7B shows results for gas transport property tests on hollow fiber samples, prepared, ozonated and tested as described in Example 1, with the exception that treatment time was either 2 hours or 1 hour at ozone concentration in the range of 1–1.1 percent by weight at about 17°–22° C. treatment temperature.

TABLE 7B

| Sample | Treatment Time (hr) | P/l Helium Unozonated | P/l Helium Ozonated | Selectivity He/N$_2$ Unozonated | Selectivity He/N$_2$ Ozonated | Ratio of Selectivity [Ozonated/Unozonated] |
|---|---|---|---|---|---|---|
| 50 | 2 | 93 | 38.5 | 59 | 246 | 4.17 |
| 51 | 2 | 100 | 37.4 | 53 | 233 | 4.40 |
| 52 | 2 | 92 | 36.7 | 59 | 199 | 3.37 |
| 53 | 2 | 109 | 39 | 55 | 226 | 4.11 |
|  |  |  |  |  | average | 4.01 |
| 54 | 1 | 106 | 51 | 61 | 142 | 2.33 |
| 55 | 1 | 86 | 43 | 53 | 109 | 2.06 |
| 56 | 1 | 81 | 44 | 54 | 126 | 2.33 |
| 57 | 1 | 105 | 59 | 55 | 119 | 2.16 |
|  |  |  |  |  | average | 2.22 |

Table 7C shows results for gas transport property tests on hollow fiber samples, prepared, ozonated and tested as described in Example 1, with the following coated, as described for coating procedures in Example 1. Gas transport property testing was conducted at a test temperature of 30°-34° C.

TABLE 7C

| Sample | Treatment Time and Ozone Concentration | P/l Helium Unozonated | P/l Helium Ozonated | Selectivity He/N$_2$ Unozonated | Selectivity He/N$_2$ Ozonated | Ratio of Selectivity [Ozonated/Unozonated] |
|---|---|---|---|---|---|---|
| 58 | 2 hrs. at 0.2-0.23 % by wt. | 155 | 77 | 50 | 178 | 3.56 |
| 59 | 4 hrs. at 0.1-0.11 % by wt. | 146 | 76 | 51 | 165 | 3.24 |
| 60 | 8 hrs. at 0.055-0.060 % by wt. | 140 | 75 | 52 | 229 | 4.40 | exceptions. Ozonation treatment time was 2, 4 or 8 hours at respective ozone concentration in the range of 0.2-0.23, 0.1-0.11 or 0.055-0.06 percent by weight, so that the numerical product of ozone concentration multiplied by treatment time was in the range of 0.4-0.5, at about 20°-25° C. treatment temperature. Samples comprised sufficient fiber to provide about 4,400 cm$^2$ of membrane area. Samples were ozonated using ozone in an air carrier gas. After ozonation the samples were baked in a nitrogen gas atmosphere at about 75° C. for about 16-21 hours. After the bake, samples were re- Table 7D shows results for gas transport property tests on hollow fiber samples, prepared, ozonated and tested as described in Example 1, with the following exceptions. Ozonation treatment time was either 1 hour or 0.5 hours at an ozone concentration of about 1 percent by weight. Ozonation treatment temperature was either about −4° to −5° C., about 22° to 25° C. or about 49° to 50° C. All samples were baked after ozonation in a nitrogen gas atmosphere at about 60°-65° C. for about 16-21 hours.

TABLE 7D

| Sample | Treatment Temperature and Time | P/l Helium Unozonated | P/l Helium Ozonated | Selectivity He/N$_2$ Unozonated | Selectivity He/N$_2$ Ozonated | Ratio of Selectivity [Ozonated/Unozonated] |
|---|---|---|---|---|---|---|
| 61 | −4 to −5° C. for 1 hr. | 116 | 52 | 56 | 115 | 2.05 |
| 62 |  | 126 | 53 | 56 | 149 | 2.66 |
| 63 |  | 124 | 47 | 47 | 157 | 3.34 |
|  |  |  |  |  | average | 2.68 |
| 64 | 22 to 25° C. for 1 hr. | 84 | 39 | 55 | 195 | 3.55 |
| 65 |  | 90 | 40 | 59 | 216 | 3.66 |
| 66 |  | 85 | 39 | 53 | 161 | 3.04 |
| 67 |  | 92 | 46 | 55 | 209 | 3.80 |
|  |  |  |  |  | average | 3.51 |
| 68 | 49 to 50° C. for 1 hr. | 99 | 36 | 68 | 185 | 2.72 |
| 69 |  | 94 | 34 | 61 | 241 | 3.95 |
| 70 |  | 111 | 38 | 61 | 204 | 3.34 |
|  |  |  |  |  | average | 3.34 |
| 71 | −4 to −5° C. for 0.5 hr. | 118 | 65 | 55 | 80 | 1.45 |
| 72 |  | 122 | 67 | 53 | 101 | 1.91 |
|  |  |  |  |  | average | 1.68 |
| 73 | 49 to 50° C. for 0.5 hr. | 127 | 60 | 60 | 124 | 2.07 |
| 74 |  | 117 | 52 | 59 | 133 | 2.25 |
| 75 |  | 104 | 43 | 56 | 126 | 2.25 |
|  |  |  |  |  | average | 2.19 |

EXAMPLE 8

TABLE 8A

| Ozone Concentration (wt %) for Ozonation Time (min.) | Sample Weight (milligrams) Before Ozonation | Sample Weight (milligrams) After Ozonation | Sample Weight (milligrams) After Bake | Weight Change After Ozonation (mg) | Weight Change After Ozonation (%) | Weight Change After Bake (mg) | Weight Change After Bake (%) | Inherent Viscosity |
|---|---|---|---|---|---|---|---|---|
| unozonated control | — | — | — | — | — | — | — | 0.48 |
| 0.15% for 60 min. | 763 | 768 | 766 | +5 | +0.7 | −2 | −38 | 0.35 |
| 0.56% for 70 min. | 736 | 752 | 745 | +16 | +2.2 | −7 | −45 | 0.24 |
| 5.8% for 60 min. | 779 | 839 | 815 | +60 | +7.7 | −24 | −40 | 0.12 |

This example illustrates that ozonation and extent of ozonation results in various manifestations in the physical, chemical and mechanical properties of the polymer material of the membrane, for example, as evidenced by changes in the weight of the ozonated membrane samples, changes in the inherent viscosity of solutions of the ozonated membrane samples, changes in the apparent polymer material molecular weight as measured by gel permeation chromatography (GPC) analysis of ozonated membrane samples, changes in the glass transition temperature (Tg) as measured by dynamic mechanical analysis of the ozonated membrane samples, changes in the stress-strain behavior of the ozonated membrane samples, changes in the bulk modulus or compressibility of the polymer material as measured by high pressure mercury intrusion analysis of the ozonated samples, changes in the infra-red spectroscopic absorption spectrum of the ozonated membrane samples, and the like, in comparison to unozonated samples of the polymer material of the membrane.

Polysulfone (Amoco, Udel P-3500) hollow fiber membrane samples and dense film samples were prepared, and ozonated, as described in Examples 1 and 3, with the following exceptions.

Samples, for which results are provided in Table 8A, were examined for changes in weight and changes in kinematic inherent viscosity in solution, as a result of various degrees of ozonation, were uncoated prior to ozonation. Samples comprised sufficient hollow fibers to provide about 100-150 cm² of membrane surface area and initial sample weights of about 700-800 milligrams (mg) and were ozonated, at a temperature in the range of about 18°-25° C. for the indicated time of treatment at the indicated ozone concentrations in oxygen carrier gas. Flow rate of the ozone containing gas was about 2.7 liters/minute. After ozonation and measurement of weight changes, ozonated samples were then baked in air at about 60°-65° C. for about 20-23 hours. Then after the bake, samples were again measured for changes in weight. Inherent viscosity results shown in Table 8A were measured on ozonated samples after the samples had been baked.

Table 8A shows changes in weight of the samples (measured before and after the ozonation and after the bake) and shows inherent viscosity values observed for 0.2 percent (weight/volume) solutions of an unozonated control sample and baked ozonated samples in chloroform at 30° C., measured kinematically using capillary viscometer tubes (Cannon Ubbelohde Type 50E347 and Cannon Type 50M768). The results shown in Table 8A illustrate that greater weight gain occurs for samples ozonated at higher ozone concentrations. These results show that further weight changes result from baking of the ozonated samples. The results also show that inherent viscosity of the ozonated and baked samples is decreased to a greater degree for samples ozonated at higher ozone concentrations.

Samples, for which results are shown in Table 8B, were examined for changes in weight as resulted from ozonation, at about 5.6 percent by weight ozone concentration in oxygen carrier gas, at ozone containing gas flow rate of 7-8 liters/minute, at a temperature in the range of 17°-24° C., for the indicated ozonation treatment times. Samples contained sufficient fibers to comprise about 4,000 cm² membrane area and initial sample weight of about 27-28 grams. Samples were uncoated prior to ozonation.

TABLE 8B

| Ozonation Treatment Time (hrs.) | Sample Weight Before Ozonation | Sample Weight After Ozonation | Weight Change from Ozonation (grams) | Weight Change from Ozonation (%) |
|---|---|---|---|---|
| 0.5 | 27.0 | 28.3 | 1.3 | 4.8 |
| 1.0 | 28.4 | 31.0 | 2.6 | 9.2 |
| 3.5 | 27.0 | 32.0 | 5.0 | 18.5 |

The sample which was ozonated for 1 hour, as shown in Table 8B, was allowed to rest in ambient laboratory air (about 50% relative humidity, about 20°-24° C.) for about 16 hours, after which the sample was reweighed. Reweighing showed a sample weight of 30.5 grams, indicating a weight loss upon resting of 0.5 grams. This 0.5 grams weight loss upon resting corresponds to a loss of about 19% of the 2.6 grams weight gain, measured prior to resting, as resulting from the ozonation. Visual observation, although subjective, indicated a discernable yellow color compared to the essentially white color appearance of the initial fiber and that of the fiber appearance immediately after ozonation.

These weight and color changes suggest that some ongoing chemical reactions occur in ozonated samples in a time frame of hours following ozonation, which chemical reactions may be responsible for the observed weight change (loss) which occurred during the resting period. These results are consistent with the results shown in Table 8A, where greater (38-45%) weight losses were observed to result from the bake of ozonated samples. The bake of ozonated samples, at least in part, hastens the time course of the chemical changes occurring subsequent to ozonation in ozonated samples.

Qualitatively similar weight changes were observed resulting from ozonation of other polymer materials, as illustrated in the above results for polysulfone samples. For example, dense films of various polymer materials, which were ozonated as described in Example 3, exhibited weight changes as follows. Samples of polycarbonate (GE, Lexan 101) gained 0.75% weight, polyimide (Ciba-Geigy, XU-218) gained 1.87% weight, poly(2,6-dimethyl)phenylene oxide (GE, PPO) gained 1.59% weight, polyamide-imide (Amoco, Torlon) gained 1.05% weight, as resultant from ozonation.

Similarly, changes in inherent viscosity were observed resultant from ozonation in polymers other than polysulfone. For example, ethyl cellulose film, ozonated as described in Example 3, was found to exhibit changes in inherent viscosity as follows, as a result of ozonation. The unozonated sample of ethyl cellulose polymer material in the form of commercially supplied polymer powder was found to exhibit a measured (0.2 percent weight/volume sample in chloroform at 30° C.) kinematic inherent viscosity essentially equal to that of the dense ethyl cellulose film sample. The ozonated ethyl cellulose film exhibited an inherent viscosity which was lower by about 19%.

The sample, which was ozonated for 1 hour as indicated in Table 8B, was subsequently divided into three portions. A first portion was not subsequently treated. A second portion was baked at about 60°-70° C. for about 16 hours in a vacuum oven at reduced pressure (about 0.1 atmospheres absolute, under a nitrogen gas purge of the oven) and a third portion was baked at the same temperature for the same length of time in an air atmosphere. Subsequently, the three portions were examined for apparent weight average molecular weight (MWw) by GPC.

GPC analyses employed tetrahydrofuran solvent mobile phase at flow rate of 1.0 ml/min at 45° C. on GPC columns of $10^2$–$10^5$ Angstroms pore size, with samples dissolved in the mobile phase solvent (10 mg/ml, 100 microliters injected), with column effluents analyzed by low angle laser light scattering detector (LDC Milton Roy KMX-6) and differential refractive index detector (Waters Associates Model 410). The GPC analyses employed standardization of molecular weight values versus U.S. National Bureau of Standards (NBS) polystyrene standard sample number 706. All samples were examined in duplicate, with standard deviations of MWw values in the range of about 1-9%. Comparison was made to fiber samples which had not been ozonated.

Results of these measurements are shown in Table 8C and illustrate that ozonation results in a decrease in apparent molecular weight and that bake of the sample after ozonation induces an apparent regain of at least a portion of the molecular weight lost due to ozonation. This example shows that the baking step is an important step in maintaining useful physical properties in the membrane sample and is a key and nonobvious part of the process of the invention.

TABLE 8C

| Ozonation/Bake Conditions | MWw by GPC (Daltons) |
|---|---|
| Unozonated Control | 50,560 |
| Ozonated + Bake in Air | 26,620 |
| Ozonated + Bake in Vacuum | 23,170 |
| Ozonated + no bake | 10,070 |

From numerous measurements (under conditions as indicated above in this Example) of kinematic inherent viscosity and GPC molecular weight (MWw) characteristics of a range of ozonated polysulfone samples, the following correlative relationship has been determined, with a correlation coefficient ($R^2$) value of 0.99 indicating reasonably precise statistical correlation:

$$MWw = antiLog\,[1.941 \times (inherent\ viscosity) + 3.729].$$

GPC measurements of ozonated and unozonated samples of polysulfone hollow fiber have consistently shown chromatograms characterized by a typical pseudo-Gaussian shape of the detector response curve versus mobile phase elution volume, reflecting a distribution of polymer chain species molecular weights in the samples, as is typical of GPC analyses of polydisperse polymeric materials. These chromatograms provide analyses of the molecular weight and molecular weight distribution of the polymer sample, one characteristic of which molecular weight is commonly expressed numerically as the weight average molecular weight (MWw) values discussed in the present Example.

It has been consistently observed that the GPC analyses of ozonated and unozonated samples of polysulfone show only a single pseudo-Gaussian shaped molecular weight distribution, that is, the GPC analyses show a single molecular weight distribution in the detector response curve versus mobile phase elution volume. That only a single distribution of molecular weights is observed and that the ozonated samples show lower MWw values than unozonated polysulfone suggests that ozonation occurs substantially throughout the membrane, rather being isolated to the surface alone.

Consider the following analysis of the relative masses of the thin dense skin and thicker underlying less dense support matrix typical of integrally-skinned asymmetric hollow fiber membranes, such as polysulfone hollow fibers. The thin dense skin comprises nominally 0.1% or less of the overall membrane wall thickness and has a density essentially that of the polymer material of the membrane. The thicker less dense underlying support matrix comprises 99.9% or more of the overall wall thickness and has a density only about half or less than half that of the polymer material of the membrane. Thus, the mass of the skin is no greater than about 1% of the total mass of the membrane sample.

Detector sensitivity and molecular weight resolution of GPC analyses are somewhat limited, such that for the GPC measurements to detect and resolve a second distribution of species molecular weights which might coexist with a first distribution of species molecular weights in a given polymer sample, the two distributions or populations of polymer species must be present in comparable relative amounts and must differ sufficiently in molecular weight. That is, two distinct molecular weight distributions, characteristic of two distinct polymer species populations, one of which populations or distributions being different than the other due to changes resultant from a process or treatment such as ozonation, could be detected and resolved by GPC analyses only if the population present in the lesser amount comprised at least about 5-20% or more of the total mass of the sample.

Thus, for the asymmetric membranes described in this example, where skin comprises such a small fraction of the total sample mass, the GPC results, which show reduced MWw values for ozonated samples, must be characteristic predominantly of the less dense underlying support matrix, by virtue of its comprising the vast majority of the total sample mass, of the asymmetric hollow fiber membrane samples. Thus, ozonation must be occurring substantially throughout the membrane sample, i.e. beneath the skin, rather than being isolated to just the surface.

Comparison measurements of bulk modulus or compressibility of the polymer material comprising the solid material of the membrane, by high pressure mercury intrusion analysis, were performed on unozonated fiber and ozonated fiber. The measurement data were collected after the pores and voids of the membrane samples had been completely filled with mercury under pressure, as determined by equivalence of the sample internal surface area values, as determined both by mercury intrusion and independently by krypton gas adsorption methods. The ozonated sample was treated with about 1 percent by weight ozone in oxygen carrier gas at a temperature of about 20°–24° C. for 1 hour. Neither sample was coated.

Such compressibility measurements show that the volume of a sample decreases with applied pressure, as the material of the sample undergoes compression. The ozonated sample requires higher applied pressure to induce a given degree of decrease in volume. That is, the ozonated material resists the effects of the applied pressure to a greater degree than the unozonated sample. For example, at an applied pressure of 20,000 psig, the unozonated sample exhibits a change in volume of about 0.25 or 25% (decreased volume under compression). At the same applied pressure, the ozonated sample volume decreased by only about 22%. Thus, the ozonated sample resisted a change in volume resulting from the applied compressive pressure more than did the unozonated sample. A more dramatic illustration from the data is provided by the following. To decrease volume about 25% for the unozonated sample requires an applied compressive pressure of about 20,000 psig, while the ozonated sample requires an applied pressure of about 36,000 psig, about 80% greater, to effect the same response.

Infra-red spectroscopy analyses of ozonated and unozonated samples of fiber and dense film show that, in the spectral region characteristic of carbonyl bond (C=O) stretching (1,700–1,800 cm$^{-1}$), unozonated polysulfone exhibits essentially no spectral band features or absorption peaks detectable above the noise level of the analysis in that spectral region. Ozonated samples, on the other hand, exhibit infra-red absorption bands or peaks in the carbonyl region. The observed intensity of the bands or peaks in that region is stronger for more extensively ozonated samples. Additional broad infra-red bands, not present in unozonated samples, are observed in the 3,000–3,600 cm$^{-1}$ spectral region in more extensively ozonated samples. These spectral features are consistent with presence of carbonyl compounds, such as carboxylic acids, aldehydes, esters, ketones, and the like, as expected from ozonation of aromatic (benzenoid) compounds, such as the aromatic rings in the polysulfone polymer, based on technical literature reviewed and described in a recent book by P. S. Bailey, "Ozonation in Organic Chemistry, Volume II, Nonolefinic Compounds", Academic Press, New York, 1982.

Glass transition temperatures (Tg) measured by dynamic mechanical analysis show that ozonation does not significantly alter that Tg compared to measurements on unozonated samples of polysulfone polymer membranes. However, very high extents of treatment (e.g., at relatively high ozone concentrations) do show Tg values increased by as much as 5° C. relative to unozonated membrane samples. Thus, it is apparent that ozonation does not, in the range of moderate extents of ozonation, significantly alter or degrade the thermal stability characteristics of polysulfone, as regards the utility of such a polymer for applications in membrane separations of gases in practical applications environments under conditions of elevated use temperature and the like.

Stress-strain behavior of polysulfone membranes was examined to determine the effect of ozonation on the overall mechanical properties, such as toughness, elongation, and the like, of membranes subjected to ozonation. Tensile pulls of ozonated and unozonated hollow fibers were run to measure the stress-strain behavior on a Rheometrics Solids Analyzer, where samples were drawn to failure, during which measurements the stress and strain were recorded. Failure stress and failure strain (percent elongation at failure) were equivalent for ozonated and unozonated samples and modulus (i.e., the integral under the measured stress-strain curve), which is known to be a measure of the toughness, increased by about 5.2%, for a sample of poly(dimethyl)siloxane coated polysulfone hollow fiber, treated with 0.4 percent by weight ozone in a carrier gas of oxygen, for 1 hour at a treatment temperature of about 22°–25° C. and subsequently baked in a nitrogen gas atmosphere at 60° C. for greater than 1 hour. Such results suggest that the overall mechanical properties of the ozonated polysulfone membranes are not dramatically altered by ozonation and, as such, the ozonated polymer membrane samples are expected to retain the practical utility in demanding gas separation applications.

EXAMPLE 9

This example illustrates ozone treatment of glassy hydrophobic polymer membranes, in the form of hollow fibers, to increase selectivity for separation of gases, using a liquid carrier fluid for effecting ozone contact with the membrane.

Polysulfone (Amoco, Udel P-3500) and polyetherimide (GE, Ultem) hollow fiber membranes and samples thereof were prepared and tested for gas transport properties, as described in Examples 1 and 2, with the following exceptions. Test temperature was in the range of 26°–31° C. Hollow fiber membranes of polyetherimide (GE, Ultem) were fabricated generally as described for polysulfone membranes in Example 1, with the following exceptions. Polymer solution from which polyetherimide hollow fiber membranes were spun comprised 38% polymer by weight dissolved in a mixture of N-methyl pyrrollidone and propionic acid (74/26 weight/weight ratio), which mixture comprised 62% by weight of the total polymer solution.

Polysulfone and polyetherimide hollow fiber membrane samples, uncoated and coated with polydimethylsiloxane, were treated with ozone dissolved in water under acidic conditions of pH 5–6, which was the unadjusted pH of house deionized water. In these cases, to insure that only dissolved ozone contacted the samples, in contrast to use of ozone in a gaseous carrier as demonstrated in Examples 1–8, a static treatment procedure was used. Ozone in air was first bubbled through the water for a period of time to produce a solution of ozone dissolved in water. Then, the ozone-containing gas flow was stopped. Following the production of the aqueous ozone solution, hollow fiber membrane samples were immersed in the solution to effect contact and treatment of the membrane with dissolved ozone. Details of the static treatment procedures used are provided for each of the following tables, which contain gas transport property test results and demonstrate the increased selectivity resulting from the treatment of the membranes using ozone dissolved in water in acidic solution.

Table 9A demonstrates increased selectivity for separation of the gas pair helium and nitrogen for poly-sulfone hollow fiber membranes treated with ozone dissolved in water under acidic conditions, using the following static treatment procedure:
  a) ozone (2.9–3.2 wt % in air) was bubbled (flow 3.9–4.8 1/min) into 3.6 liters water at 20°–25° C. for 30 min, then the ozone-containing gas flow was shut off,
  b) then samples were immersed in the water for 1 hr,
  c) following the 1 hr treatment, the samples were removed from the water and dried for about 30 minutes in air at about 75° C.,
  d) the treated dried samples were coated and tested for gas transport properties.

TABLE 9A

| sample | before treatment | | after treatment and coating | |
|---|---|---|---|---|
| | P/l He | Selectivity He/N2 | P/l He | Selectivity He/N2 |
| 76 not coated before treatment | — | — | 89.6 | 113 |
| 77 coated before treatment | 139 | 57 | 96.0 | 90.4 |

The polysulfone sample which was not coated prior to treatment was not tested prior to treatment. The polysulfone sample which was coated before treatment shows He/N2 selectivity of 57, which is typical of the untreated membrane for this gas pair at the test temperature of about 30° C. For example, seven coated untreated samples were tested and found to have an average He/N2 selectivity of 54.7, as shown in Table 9B.

TABLE 9B

| sample | P/l He | Selectivity He/N2 |
|---|---|---|
| 78 | 139 | 57 |
| 79 | 148 | 52 |
| 80 | 130 | 55 |
| 81 | 128 | 53 |
| 82 | 139 | 54 |
| 83 | 142 | 55 |
| 84 | 136 | 57 |
| average | 137 | 54.7 |

After treatment and drying, the treated samples were coated to seal any minor imperfections in the membrane, as described in Example 1. Data in Table 9A show that polysulfone membranes exhibit significantly increased selectivity as the result of treatment with ozone dissolved in aqueous solution at acidic pH.

Table 9C demonstrates increased selectivity for separation of the gas pair helium and nitrogen for polyetherimide hollow fiber membranes treated with ozone dissolved in water under acidic conditions, using the following static treatment procedure:
  a) ozone (3.3–3.6 wt % in air) was bubbled (flow 3.9–4.1 1/min) into 3.6 liters water at 20°–25° C. for 210 min, then the ozone-containing gas flow was shut off,
  b) then samples were immersed in the water for 75 min,
  c) following the 75 min treatment, the samples were removed from the water and dried for about 30 minutes in air at about 75° C.,
  d) the treated dried samples were coated and tested for gas transport properties.

Results of gas transport property tests of polyetherimide membranes treated for 75 minutes are shown in Table 9C.

TABLE 9C

| sample | before treatment | | after treatment and coating | |
|---|---|---|---|---|
| | P/l He | Selectivity He/N2 | P/l He | Selectivity He/N2 |
| 85 coated before treatment | 97.9 | 233 | 53.1 | 335 |
| 86 not coated before treatment | 185 | 7.3 | 54.4 | 436 |

Test results in Tables 9C for the untreated polyetherimide sample which was not coated before treatment show low He/N2 selectivity characteristic of the effects of minor imperfections in the membrane. The sample which was coated prior to treatment shows higher selectivity characteristic of the membrane where such imperfections have been sealed by the coating, as described in Example 1.

Results in Tables 9C demonstrate that selectivity of polyetherimide membranes, as was shown for polysulfone membranes in Table 9A, can be significantly increased by treatment of using ozone water solutions at acidic conditions. Results in this example also show that increased selectivity results from such treatments, whether or not the membrane has been previously coated.

None of the treatment procedures used for samples reported in Tables 9A, 9B or 9C employed gaseous ozone contacting the membranes. In those cases, no ozone-containing gas was present when the samples were present. Only dissolved ozone in acidic aqueous solution was in contact with the membranes.

To demonstrate that increased selectivity also results from treatment of glassy hydrophobic polymer membranes in the presence of both gaseous ozone and ozone dissolved in acidic aqueous solution, the following dynamic treatment procedure was employed on samples of polysulfone hollow fiber membranes:
  a) ozone (3.3–3.6 wt % in air) was bubbled (flow 3.8–3.9 1/min) into 3.6 liters water at 20°–25° C. for 45 min, during which time period the samples were immersed in the water,
  b) following the 45 min treatment, the samples were removed from the water and dried for about 30 minutes in air at about 75° C.,
  c) the treated dried samples were coated and tested for gas transport properties.

Results of gas transport property tests for polysulfone membrane samples treated using the dynamic treatment procedure as shown in Table 9D.

TABLE 9D

| sample | before treatment | | after treatment and coating | |
|---|---|---|---|---|
| | P/l He | Selectivity He/N2 | P/l He | Selectivity He/N2 |
| 87 not coated before treatment | — | — | 71.4 | 132 |
| 88 coated before treatment | 148 | 52 | 72.8 | 153 |

The results in Table 9D show that increased membrane selectivity is obtained when both gaseous ozone and dissolved aqueous ozone at acidic pH is used in the membrane treatment. There may be advantages in some circumstances to combine gaseous and liquid carriers for ozone in the treatment of membranes. For example, the presence of a liquid carrier provides a more effective way to dissipate exothermic heat of reaction of ozone with the polymer membrane and thus may provide better control and uniformity of treatment conditions, such as treatment temperature, than in cases where ozone is brought into contact with the membrane in a gaseous carrier fluid alone. Such control and uniformity of conditions may be very important in practical large scale treatment processes, for example in the treatment of commercial size membrane gas separators to increase membrane selectivity.

Ozone is known (Bailey, 1982) to have a relatively high solubility, compared to other gases such as oxygen or nitrogen, in water and in other liquids such as acetic acid and fluorinated hydrocarbon liquids (freons) that may be of practical interest as carrier fluids for treatment of membranes. In the case of water, ozone is known ("Ozone in Water Treatment: Application and Engineering", B. Lanlais, D. A. Rackhow and D. R. Brink, editors, Lewis Publishers, Chelsea, MI, 1991, Chapter 2, pp. 11-132) to dissolve, exist as the ozone molecule for practically useful periods of time, and behave chemically like ozone in the gaseous phase regarding reactions with a variety of organic compounds, as long as the water is relatively acidic pH. It is known that hydroxide ion, OH-, catalyses the reaction of ozone with water to generate a variety of non-ozone species. At high pH, for example pH greater than 10, ozone is very rapidly destroyed.

Results shown in Table 9E for polysulfone membranes treated using the following static treatment procedure at high pH demonstrate that strongly basic aqueous solutions (water pH adjusted to 10.5-11.5 by addition of sodium hydroxide to house deionized water) of ozone do not apparently give increased membrane selectivity:

a) ozone (3.3-3.6 wt % in air) was bubbled (flow 3.8-4.0 l/min) into 3.6 liters water at 20°-25° C. for 1 hour, then ozone-containing gas flow shut off,
b) then samples were immersed in the water for either 30 min or 1 hr exposure durations, as indicated,
c) following the exposure, the samples were removed from the water and dried for about 30 min in air at about 75° C.,
d) the treated dried samples were coated and tested for gas transport properties.

TABLE 9E

| sample | before treatment | | after treatment and coating | |
|---|---|---|---|---|
| | P/l He | Selectivity He/N2 | P/l He | Selectivity He/N2 |
| 30 min exposure | | | | |
| 89 | — | — | 120 | 57.3 |
| not coated before treatment | | | | |
| 90 | 128 | 53 | 104 | 58.6 |
| coated before treatment | | | | |
| 1 hr exposure | | | | |
| 91 | — | — | 112 | 56.5 |
| not coated before treatment | | | | |
| 92 | 130 | 55 | 249 | 4.9 |
| coated before treatment | | | | |

The results for treated samples in Table 9E show He/N2 selectivity essentially unchanged from values expected of untreated membranes of the same polymer, from comparison to samples before treatment in Table 9E and to untreated samples in Table 9B. This demonstrates that the reactant ozone must be present in contact with the membrane for the treatment to be effective. At basic pH in water, apparently ozone is destroyed too rapidly to be present in effective amounts in solution. The very low selectivity of the 1 hr treated sample in Table 9E, together with the very high P/l He, may indicated that some damage occurred in treatment, handling or testing of this sample.

EXAMPLE 10

This example illustrates treatments of glassy hydrophobic polymer membranes with chemical reactants or oxidative reactants other than ozone for increasing the selectivity of the membranes for separation of gases. Polysulfone asymmetric hollow fiber membranes used in this example were fabricated as described in Example 1.

Treatments in this example were executed on samples of hollow fiber membranes comprised of bundles of about 60 fibers in lengths of about 30-50 cm. The bundles of fibers were sealed at each end to close the bores or lumens of the fibers by melting the polymer of the membrane with heat from an electrically resistively heated metal wire.

In all of the cases described in this example, bundles of fiber were placed in a glass test tube into which was poured the aqueous treatment solution which contained the chemical reactant or oxidative reactant employed. Further details of each treatment (reactant, its concentration, treatment time and temperature) are shown in the respective cases later in this example.

Following the exposure of the membranes to the treatment solution, fiber bundles were removed from the test tube containing the treatment solution. Then the bores of the fiber in the bundle were opened by cutting off about 1 cm length from each end of the bundle with scissors. Then the bundle was loosely tied with an inert Teflon cord at a point within 2 cm of the end of the bundle, such tie being used to keep the bundle of fibers intact during subsequent water washing and drying.

The bundle was then immersed for about 1 hr in deionized water at 20°-25° C. to rinse off the treatment solution, then the bundle was further rinsed in flowing (0.8 l/min) tap water at 20°-25° C. in a cylindrical plastic tube (about 2 liter volume) for a period of 12-16 hrs. After rinsing, the fiber bundle was hung vertically in ambient air (20°-25° C.) to dry for 24-96 hrs. Then the fiber was further dried at about 80° C. under vacuum for 2 hours. Samples of the treated hollow fiber membranes were subsequently prepared for gas transport property testing as described in Example 1.

After gas transport property testing was conducted on the treated samples, some of the treated samples were exposed to a thermal relaxation treatment (5 hrs at 130° C. in air) similar to those described in Example 4. Following the relaxation treatment, samples were re-coated to seal imperfections in the membrane as described in Example 1, and in the case of plasticization relaxation treatment, samples were repaired using epoxy to ensure that no leaks occurred due to liquid mixture induced damage at the epoxy castings in the gas test samples. Subsequently, treated coated relaxed samples were again tested for gas transport properties.

Gas transport property test results shown in the tables for this example do not include data for these samples before treatment, since the fiber bundles were treated before preparation of gas transport property test samples. Comparison of the gas transport property data for samples after treatment in these tables, particularly the He/N2 selectivity values, should be made with data for untreated coated polysulfone samples in Table 9B. Data in Table 9B show average He/N2 selectivity of 54.7 for untreated coated polysulfone membranes. The membranes used in the treatments described in the present example were from the same fabrication run as those untreated membranes for which gas transport property test results are shown in Table 9B.

Table 10A shows results of gas transport property tests of polysulfone hollow fiber samples treated with sodium hypochlorite (Na°Cl) in 5.25 wt % aqueous solution at 63°-66° C. treatment temperature for various treatment times.

TABLE 10A

| sample | after treatment and coating | | after 130° C./5 hr and recoat | |
|---|---|---|---|---|
| | P/l He | Selectivity He/N2 | P/l He | Selectivity He/N2 |
| 15 min treatment time | | | | |
| 93 | 106 | 77.9 | 22.2 | 75.6 |
| 94 | 104 | 82.6 | not subjected to relaxation | |
| 95 | 106 | 68.4 | not subjected to relaxation | |
| 30 min treatment time | | | | |
| 96 | 111 | 83.4 | 22.5 | 68.9 |
| 97 | 107 | 84.9 | 19.4 | 75.9 |
| 98 | 107 | 66.3 | not subjected to relaxation | |
| 99 | 85 | 64.7 | not subjected to relaxation | |
| 1 hr treatment time | | | | |
| 100 | 111 | 79.5 | 24.5 | 58.1 |
| 101 | 106 | 79.7 | 25.7 | 71.1 |
| 102 | 104 | 69.0 | not subjected to relaxation | |

Table 10B shows results of gas transport property tests of polysulfone hollow fiber samples treated with potassium persulfate (K2S2O8) in 0.1 molar (2.7 wt %) aqueous solution at 81°-89° C. treatment temperature for various treatment times.

TABLE 10B

| sample | after treatment and coating | | after 130° C./5 hr and recoat | |
|---|---|---|---|---|
| | P/l He | Selectivity He/N2 | P/l He | Selectivity He/N2 |
| 5 min treatment time | | | | |
| 103 | 110 | 103 | 3.25 | 71.5 |
| 104 | 93.2 | 75.9 | not subjected to relaxation | |
| 105 | 90.7 | 77.3 | not subjected to relaxation | |
| 1 hr treatment time | | | | |
| 106 | 117 | 103 | 4.55 | 84.3 |
| 107 | 87.9 | 85.5 | not subjected to relaxation | |
| 108 | 109 | 86.9 | not subjected to relaxation | |
| 2 hr treatment time | | | | |
| 109 | 130 | 89.5 | 4.16 | 69.3 |
| 110 | 109 | 85.8 | not subjected to relaxation | |
| 111 | 112 | 87.9 | not subjected to relaxation | |

Results of gas transport property tests shown in Tables 10A and 10B for samples treated with these non-ozone treatments show significant increases in selectivity for the separation of the test gas pair. These samples also show relaxation of the high treated selectivities after execution of the thermal relaxation treatments.

This demonstrates that treatments of preformed membranes of glassy hydrophobic polymers with chemical reactants or oxidative reactants other than ozone can yield increases in selectivity for separation of gases and that the treated membrane is in a nonequilibrium state as described in Example 4. Other chemical reactants or oxidative reactants may also be found effective and optimum treatments conditions for obtaining a particular degree of increase in selectivity will depend on factors such as the nature of the glassy hydrophobic polymer material of the preformed membrane and the reactivity of the reactant with a particular polymeric material.

What is claimed is:

1. Gas permeable membrane comprising a glassy polymeric material, said membrane having been preformed and then chemically modified throughout the thickness thereof with a reactant and having selectivity for a pair of gases, vapors or molecules which is significantly greater than the intrinsic selectivity of said glassy polymeric material and which is significantly greater than the equilibrium intrinsic selectivity of the chemically modified glassy polymeric material for the same pair of gases, vapors or molecules.

2. The membrane of claim 1 wherein said reactant is an oxidative gas phase reactant.

3. The membrane of claim 2 wherein said oxidative gas phase reactant is ozone.

4. The membrane of claim 1 wherein said reactant is selected from the group consisting of nitrogen oxides, persulfate ion, hypochlorite ion and ozone.

5. The membrane of claim 1 wherein the reactant is ozone.

6. The membrane of claim 1 wherein the selectivity is from about 5% to about 2,000% greater than the intrinsic selectivity of said glassy polymeric material.

7. The membrane of claim 1 wherein said glassy polymeric material is selected from the group consisting of polysulfones, polyphenylene oxides, polyetherketones, polycarbonates, polyimides, polyetherimides, polyamides, polyamide-imides, polyesters, polyester-carbonates, polyarylimides, cellulosic materials, styrenic polymers, acrylonitrile polymers and blends and copolymers thereof.

8. The membrane of claim 1 wherein said glassy polymeric material is a polysulfone.

9. The membrane of claim 1 wherein said reactant is ozone and said glassy polymeric material is selected from polysulfones, polyphenylene oxides, polyimides, polyarylsulfones, polyethersulfones, ethyl cellulose, polyetherimides, polycarbonates, acrylonitrile/styrene copolymer, polyamide-imides, polyamides and cellulose acetate.

10. The membrane of claim 9 wherein said glassy polymeric material is a polysulfone.

11. Gas permeable membrane comprising a glassy polymeric material having been treated in the form of a preformed membrane with ozone under conditions such that the total uptake of ozone is from about 0.01 wt. % to about 40 wt. % based on the weight of the membrane prior to having been treated with ozone.

12. The membrane of claim 11 wherein said glassy polymeric material is selected from the group consisting of polysulfones, polyphenylene oxides, polyetherketones, polycarbonates, polyimides, polyetherimides, polyamides, polyamide-imides, polyesters, polyestercarbonates, polyarylimides, cellulosic materials, styrenic polymers, and blends and copolymers thereof.

13. The membrane of claim 11 wherein said glassy polymeric material is a polysulfone.

14. The membrane of claim 11 wherein said glassy polymeric material is selected from polysulfones, polyphenylene oxides, polyimides, polyarylsulfone, polyethersulfone, ethyl cellulose, polyetherimides, polycarbonates, acrylonitrile/styrene copolymer, polyamideimides, polyamides and cellulose acetate.

15. The membrane of claim 11 wherein said glassy polymeric material is an acrylonitrile/styrene copolymer.

16. The membrane of claim 11 wherein said glassy polymeric material is a polyphenylene oxide.

17. The membrane of claim 11 wherein said glassy polymeric material is a polyethersulfone.

18. The membrane of claim 11 wherein said glassy polymeric material is a polyarylsulfone.

19. The membrane of claim 11 wherein said glassy polymeric material is a polyetherketone.

20. The membrane of claim 11 wherein said glassy polymeric material is a polyimide.

21. The membrane of claim 11 wherein said glassy polymeric material is a polyetherimide.

22. The membrane of claim 11 wherein said glassy polymeric material is a polyamide.

23. The membrane of claim 11 wherein said glassy polymeric material is a polyamide-imide.

24. The membrane of claim 11 wherein said glassy polymeric material is ethyl cellulose.

25. Method of producing the gas permeable membrane of claim 1 comprising exposing a preformed membrane comprising at least one glassy polymeric material to an effective amount of reactant at a suitable temperature for a suitable period of time to provide the gas permeable membrane having a selectivity for a pair of gases, vapors or molecules which is significantly greater than the intrinsic selectivity of said glassy polymeric material and which is significantly greater than the equilibrium intrinsic selectivity of the chemically modified glassy polymeric material for the same pair of gases, vapors or molecules.

26. Method of claim 25 wherein said reactant is ozone and said effective amount is from about 0.01 to about 10 wt. % in a carrier gas.

27. Method of claim 25 wherein said suitable temperature falls within a range of from about −20° C. to about 120° C.

28. Method of claim 25 wherein said suitable period of time falls within a range of from 5 minutes to about 24 hours.

29. Method of claim 25 wherein said suitable temperature falls within a range of from about −10° C. to about 50° C.

30. Method of claim 25 wherein said suitable temperature falls within a range of from about 0° C. to about 30° C.

31. Method of claim 25 wherein said suitable temperature is ambient temperature.

32. Method of claim 25 wherein said suitable period of time falls within a range of from about 5 minutes to about 10 hours.

33. Method of claim 25 wherein said reactant is ozone, said effective amount is from about 0.05 wt. % to about 0.5 wt. %, said suitable period of time is from about 1 to about 8 hours, and said temperature falls within a range of from about 15° C. to about 30° C.

34. Method of claim 33 wherein said effective amount of ozone is 0.1 wt %, said suitable period of time is 4 hours.

35. Gas permeable composite membrane comprising two or more polymeric materials wherein at least one of said materials is a glassy polymeric material and acts as a separating layer and said composite acts as a separating membrane, said composite membrane having been modified throughout the thickness of at least the separating layer thereof with a chemical reactant and having selectivity for a pair of gases, vapors or molecules which is greater than the intrinsic selectivity of the unmodified polymeric material of the separating layer of the membrane and which is greater than the equilibrium intrinsic selectivity of the modified polymeric material of the separating membrane.

36. The membrane of claim 35 wherein said chemical reactant is an oxidative reactant.

37. The membrane of claim 36 wherein said oxidative reactant is selected from the group consisting of nitrogen oxides, persulfate ion, hypochlorite ion, and ozone.

38. The membrane of claim 36 wherein the oxidative reactant is ozone.

39. The membrane of claim 35 wherein the modified composite membrane has a selectivity which ranges from about 5% to about 2,000% greater than the intrinsic selectivity of said glassy polymeric material.

40. The membrane of claim 35 wherein said glassy polymeric material is selected from the group consisting of polysulfones, polyphenylene oxides, polyetherketones, polycarbonates, polyimides, polyesters, polyester-carbonates, polyarylimides, cellulosic materials and blends and copolymers thereof.

41. The membrane of claim 35 wherein said glassy polymeric material is a polysulfone.

42. The membrane of claim 35 wherein said chemical reactant is ozone and said glassy polymeric material is selected from polysulfones, polyphenylene oxides, polyimides, polyarylsulfones, polyethersulfone, ethyl cellulose, polyetherimides, polycarbonates, acrylonitrile/styrene copolymers, polyamide-imides, polyamides and cellulose acetate.

43. The membrane of claim 42 wherein said glassy polymeric material is a polysulfone.

44. The membrane of claim 42 wherein said glassy polymeric material is a polyether sulfone, a polyarylsulfone polyphenylene oxide or ethyl cellulose.

45. Method of producing the gas permeable composite membrane of claim 35 comprising the step of modifying the separating membrane with a chemical reactant which is ozone prior to applying a coating to the membrane to provide the composite membrane having a selectivity for a pair of gases, vapors or molecules which is greater than the intrinsic selectivity of the unmodified polymeric material of the separating layer of the membrane and which is greater than the equilibrium intrinsic selectivity of the modified polymeric material of the separating membrane.

46. Method of producing the gas permeable composite membrane of claim 35 comprising the step of modifying a composite membrane comprising a glassy polymeric membrane and a coating with a chemical reactant which is ozone to provide the composite membrane having a selectivity for a pair of gases, vapors or molecules which is greater than the intrinsic selectivity of the unmodified polymeric material of the separating layer of the membrane and which is greater than the equilibrium intrinsic selectivity of the modified polymeric material of the separating membrane.

47. Method of separating a gas from a mixture of fluids comprising bringing said mixture into contact with a gas permeable membrane of claim 1 and withdrawing permeate and nonpermeate product streams.

48. In a method for enhancing the concentration of a gas in a gas stream by removing other gases from said stream, the improvement which comprises bringing the gas stream into contact with a gas permeable membrane of claim 1 and withdrawing permeate and nonpermeate product streams.

49. Method of separating a gas from a mixture of fluids comprising bringing said mixture into contact with a gas permeable membrane of claim 11 and withdrawing permeate and nonpermeate product streams.

50. In a method for enhancing the concentration of a gas in a gas stream by removing other gases from said stream, the improvement which comprises bringing the gas stream into contact with a gas permeable membrane of claim 11 and withdrawing permeate and nonpermeate product streams.

51. Method of separating a gas from a mixture of fluids comprising bringing said mixture into contact with a gas permeable composite membrane of claim 35 and withdrawing permeate and nonpermeate product streams.

52. In a method for enhancing the concentration of a gas in a gas stream by removing other gases from said stream, the improvement which comprises bringing the gas stream into contact with a gas permeable membrane of claim 35 and withdrawing permeate and nonpermeate streams.

53. Gas permeable membrane comprising a glassy polymeric material having been treated in the form of a preformed membrane with a gas containing ozone under conditions such that the total uptake of ozone is from about 0.01 wt. % to about 40 wt. % based on the weight of the membrane prior to having been treated with said gas containing ozone.

54. The membrane of claim 53 wherein said glassy polymeric material is selected from the group consisting of polysulfones, polyphenylene oxides, polyetherketones, polycarbonates, polyimides, polyetherimides, polyamides, polyamide-imides, polyesters, polyestercarbonates, polyarylimides, cellulosic materials, styrenic polymers, and blends and copolymers thereof.

55. The membrane of claim 53 wherein said glassy polymeric material is a polysulfone.

56. The membrane of claim 53 wherein said glassy polymeric material is selected from polysulfones, polyphenylene oxides, polyimides, polyarylsulfone, polyethersulfone, ethyl cellulose, polyetherimides, polycarbonates, acrylonitrile/styrene copolymer, polyamide-imides, polyamides and cellulose acetate.

57. The membrane of claim 53 wherein said glassy polymeric material is a acrylonitrile/styrene copolymer.

58. The membrane of claim 53 wherein said glassy polymeric material is a polyphenylene oxide.

59. The membrane of claim 53 wherein said glassy polymeric material is a polyethersulfone.

60. The membrane of claim 53 wherein said glassy polymeric material is a polyarylsulfone.

61. The membrane of claim 53 wherein said glassy polymeric material is a polyetherketone.

62. The membrane of claim 53 wherein said glassy polymeric material is a polyimide.

63. The membrane of claim 53 wherein said glassy polymeric material is a polyetherimide.

64. The membrane of claim 53 wherein said glassy polymeric material is a polyamide.

65. The membrane of claim 53 wherein said glassy polymeric material is a polyamide-imides.

66. The membrane of claim 53 wherein said glassy polymeric material is ethyl cellulose.

67. A method for preparing a gas permeable membrane being comprised of one or more polymeric materials wherein at least one of said materials is a glassy polymer which acts as a separating membrane comprising the step of subjecting said membrane to treatment with an oxidative reactant by exposing at least one side of said membrane to a liquid or gas containing said oxidative reactant to obtain a separating membrane having selectivity for a pair of gases, vapors or molecules which is greater than the intrinsic selectivity of the unmodified polymeric material of the separating membrane and which is greater than the equilibrium intrinsic selectivity of the modified polymeric material of the separating membrane.

68. The method of claim 67 wherein the gas permeable membrane is heated in an inert atmosphere at a temperature above about 50° C. but at least 50° C. less than the Tg of the glassy polymer before or after a coating is applied to said membrane.

69. The method of claim 67 including the additional step of applying a coating to the gas permeable membrane.

70. The method of claim 67 wherein said oxidative reactant is a liquid containing ozone.

71. The method of claim 67 wherein said oxidative reactant is a gas containing ozone.

72. The method of claim 67 wherein said oxidative reactant is a liquid containing at least one of the group consisting of nitrogen oxides, persulfate ion, hypochlorite ion and ozone.

73. The method of claim 67 wherein said oxidative reactant is ozone and said glassy polymer is selected from the group consisting of polysulfones, polyphenylene oxides, polyimides, polyarylsulfone, polyethersulfone, ethyl cellulose, polyetherimides, polycarbonates, acrylonitrile/styrene copolymer, polyamide-imides, polyamides and cellulose acetate.

74. A method for preparing a gas permeable composite membrane being comprised of two or more polymeric materials wherein at least one of said materials is a glassy polymer which acts as a separating layer comprising the step of subjecting said membrane to treatment with an oxidative reactant by exposing at least one side of said membrane to a liquid or gas containing said oxidative reactant to obtain a separating membrane having selectivity for a pair of gases, vapors or molecules which is greater than the intrinsic selectivity of the unmodified polymeric material of the separating layer of the membrane and which is greater than the equilibrium intrinsic selectivity of the modified polymeric material of the separating membrane.

75. The method of claim 74 including the additional step wherein the gas permeable composite membrane is heated in an inert atmosphere at a temperature above about 50° C. but at least 50° C. less than the Tg of the glassy polymer before or after a coating is applied to said membrane.

76. The method of claim 74 including a step of applying a coating to the gas permeable composite membrane.

77. The method of claim 74 wherein said oxidative reactant is a liquid containing ozone.

78. The method of claim 74 wherein said oxidative reactant is a gas containing ozone.

79. The method of claim 74 wherein said oxidative reactant is a liquid containing at least one of the group consisting of nitrogen oxides, persulfate ion, hypochlorite ion and ozone.

80. The method of claim 74 wherein said oxidative reactant is ozone and said glassy polymer is selected from the group consisting of polysulfones, polyphenylene oxides, polyimides, polyarylsulfone, polyethersulfone, ethyl cellulose, polyetherimides, polycarbonates, acrylonitrile/styrene copolymer, polyamide-imides, polyamides and cellulose acetate.

81. A method for preparing a gas permeable composite membrane being comprised of two or more polymeric materials wherein at least one of said materials is a glassy polymer which acts as a separating layer comprising the steps of
   a) subjecting a preformed membrane to treatment with an oxidative reactant by exposing at least one side of said membrane to a liquid or gas containing said oxidative reactant; and
   b) removing the remaining gas or liquid containing said oxidative reactant from said membrane to obtain a gas permeable composite membrane having selectivity for a pair of gases, vapors or molecules which is greater than the intrinsic selectivity of the unmodified polymeric material of the separating layer of the membrane and which is greater than the equilibrium intrinsic selectivity of the modified polymeric material of the separating membrane.

82. The method of claim 81 wherein a coating is applied to the gas permeable composite membrane or to the preformed membrane.

83. The method of claim 81 wherein said membrane is heated in an inert atmosphere at a temperature above about 50° C. but at least 50° C. less than the Tg of said glassy polymer.

84. The method of claim 81 wherein said membrane is heated in an inert atmosphere at a temperature above about 50° C. but at least 50° C. less than the Tg of said glassy polymer before or after a coating is applied to said membrane.

85. The method of claim 81 wherein said oxidative reactant is a liquid containing ozone.

86. The method of claim 81 wherein said oxidative reactant is a gas containing ozone.

87. The method of claim 81 wherein said oxidative reactant is a liquid containing at least one of the group consisting of nitrogen oxides, persulfate ion, hypochlorite ion, and ozone.

88. A method for preparing a gas permeable membrane being comprised of one or more polymeric materials wherein at least one of said materials is a glassy polymer which acts as a separating membrane comprising the steps of
   a) subjecting a preformed membrane to treatment with an oxidative reactant by exposing at least one side of said membrane to a liquid or gas containing said oxidative reactant; and
   b) removing the remaining gas or liquid containing said oxidative reactant from said membrane to obtain a gas permeable membrane having selectivity for a pair of gases, vapors or molecules which is greater than the intrinsic selectivity of the unmodified polymeric material of the membrane and which is greater than the equilibrium intrinsic selectivity of the modified polymeric material of the separating membrane.

89. The method of claim 88 wherein a coating is applied to the gas permeable membrane or to the preformed membrane.

90. The method of claim 88 wherein said membrane is heated in an inert atmosphere at a temperature above about 50° C. but at least 50° C. less than the Tg of said glassy polymer.

91. The method of claim 88 wherein said membrane is heated in an inert atmosphere at a temperature above about 50° C. but at least 50° C. less than the Tg of said glassy polymer before or after a coating is applied to said membrane.

92. The method of claim 88 wherein said oxidative reactant is a liquid containing ozone.

93. The method of claim 88 wherein said oxidative reactant is a gas containing ozone.

94. The method of claim 88 wherein said oxidative reactant is a liquid containing at least one of the group consisting of nitrogen oxides, persulfate ion, hypochlorite ion, and ozone.

95. A process for separating at least one gas in a gaseous mixture from at least one other gas in the gaseous mixture by selective permeation and providing a permeated product containing at least one permeating gas, comprising: contacting the gaseous mixture with one surface of the membrane of claim 1, which, with respect to at least one pair of gases of the gaseous mixture, the membrane exhibits selective permeation of one gas of the pair of gases over that of the remaining ga of the pair of gases, permeating the at least one permeating gas into and through the membrane, and removing from the vicinity of the opposite surface a permeated product having a different proportion of the at least one gas of the gaseous mixture to the at least one other gas of the gaseous mixture than the proportion in the gaseous mixture of the at least one gas to the at least one other gas.

96. A process for separating at least one gas in a gaseous mixture from at least one other gas in the gaseous mixture by selective permeation and providing a permeated product containing at least one permeating gas, comprising: contacting the gaseous mixture with one surface of the membrane of claim 11, which, with respect to at least one pair of gases of the gaseous mixture, the membrane exhibits selective permeation of one gas of the pair of gases over that of the remaining gas of the pair of gases, permeating the at least one permeating gas into and through the membrane, and removing from the vicinity of the opposite surface a permeated product having a different proportion of the at least one gas of the gaseous mixture to the at least one other gas of the gaseous mixture than the proportion in the gaseous mixture of the at least one gas to the at least one other gas.

97. A process for separating at least one gas in a gaseous mixture from at least one other gas in the gaseous mixture by selective permeation and providing a permeated product containing at least one permeating gas, comprising: contacting the gaseous mixture with one surface of the membrane of claim 35, which, with respect to at least one pair of gases of the gaseous mixture, the membrane exhibits selective permeation of one gas of the pair of gases over that of the remaining gas of the pair of gases, permeating the at least one permeating gas into and through the membrane, and removing from the vicinity of the opposite surface a permeated product having a different proportion of the at least one gas of the gaseous mixture to the at least one other gas of the gaseous mixture than the proportion in the gaseous mixture of the at least one gas to the at least one other gas.

98. A process for separating at least one gas in a gaseous mixture from at least one other gas in the gaseous mixture by selective permeation and providing a permeated product containing at least one permeating gas, comprising contacting the gaseous mixture with one surface of the membrane of claim 53, which, with respect to at least one pair of gases of the gaseous mixture, the membrane exhibits selective permeation of one gas of the pair of gases over that of the remaining gas of the pair of gases, permeating the at least one permeating gas into and through the membrane, and removing from the vicinity of the opposite surface a permeated product having a different proportion of the at least one gas of the gaseous mixture to the at least one other gas of the gaseous mixture than the proportion in the gaseous mixture of the at least one gas to the at least one other gas.

* * * * *